(12) United States Patent
Uchiyama et al.

(10) Patent No.: US 7,443,565 B2
(45) Date of Patent: Oct. 28, 2008

(54) IMAGE DISPLAY APPARATUS, PROJECTOR, AND POLARIZATION COMPENSATION SYSTEM

(75) Inventors: Shoichi Uchiyama, Shimosuwa-machi (JP); Junichi Nakamura, Shiojiri (JP); Takashi Nitta, Chino (JP); Tsunemori Asahi, Hotaka-machi (JP)

(73) Assignee: Seiko Epson Corporation, Tokyo (JP)

( * ) Notice: Subject to any disclaimer, the term of this patent is extended or adjusted under 35 U.S.C. 154(b) by 110 days.

(21) Appl. No.: 11/143,480

(22) Filed: Jun. 3, 2005

(65) Prior Publication Data

US 2005/0270618 A1    Dec. 8, 2005

(30) Foreign Application Priority Data

Jun. 4, 2004    (JP) ............................. 2004-166947

(51) Int. Cl.
    *G02F 1/1347* (2006.01)
(52) U.S. Cl. ........................... 359/259; 348/758; 349/8; 349/9
(58) Field of Classification Search .................. 359/259; 348/758; 349/8, 9
    See application file for complete search history.

(56) References Cited

U.S. PATENT DOCUMENTS

| | | | |
|---|---|---|---|
| 4,541,691 A * | 9/1985 | Buzak | ........................... 349/75 |
| 5,497,254 A | 3/1996 | Amako et al. | |
| 5,682,214 A | 10/1997 | Amako et al. | |
| 5,978,142 A * | 11/1999 | Blackham et al. | ........... 359/618 |
| 6,417,892 B1 * | 7/2002 | Sharp et al. | .................. 348/742 |
| 6,631,995 B2 | 10/2003 | Stanton et al. | |
| 6,683,657 B1 | 1/2004 | Miyawaki | |
| 6,722,768 B1 | 4/2004 | Takezawa | |
| 6,905,216 B2 | 6/2005 | Stanton et al. | |

FOREIGN PATENT DOCUMENTS

| | | |
|---|---|---|
| JP | A 11-072710 | 3/1999 |
| JP | A 2001-100689 | 4/2001 |
| JP | A 2001-100699 | 4/2001 |
| JP | A-2001-174776 | 6/2001 |
| JP | A 2001-194626 | 7/2001 |
| JP | A 2001-311912 | 11/2001 |
| JP | A 2002-324342 | 11/2002 |
| JP | A 2003-509713 | 3/2003 |
| JP | A 2003-131322 | 5/2003 |
| JP | A 2003-149730 | 5/2003 |
| JP | A 2004-151186 | 5/2004 |
| WO | WO 02/086610 | 10/2002 |

OTHER PUBLICATIONS

Debevec et al., "Recovering High Dynamic Range Radiance Maps from Photographs", Proceedings of ACM SIGGRAPH97, pp. 367-378 (1997).
Drago et al., "Adaptive Logarithmic Mapping for Displaying High Contrast Scenes", Eurographics 2003, vol. 22.

* cited by examiner

*Primary Examiner*—Hung X. Dang
*Assistant Examiner*—Joseph Martinez
(74) *Attorney, Agent, or Firm*—Oliff & Berridge, PLC

(57) ABSTRACT

Aspects of the invention can provide an image display apparatus for displaying an image by modulating light from a light source based on display image data. The apparatus can include a first light modulator device can modulate light from the light source, a second light modulator device that can modulate the light from the first light modulator device, and a polarization compensation system disposed between the first light modulator device and the second light modulator device for compensating a polarization state of light.

11 Claims, 14 Drawing Sheets

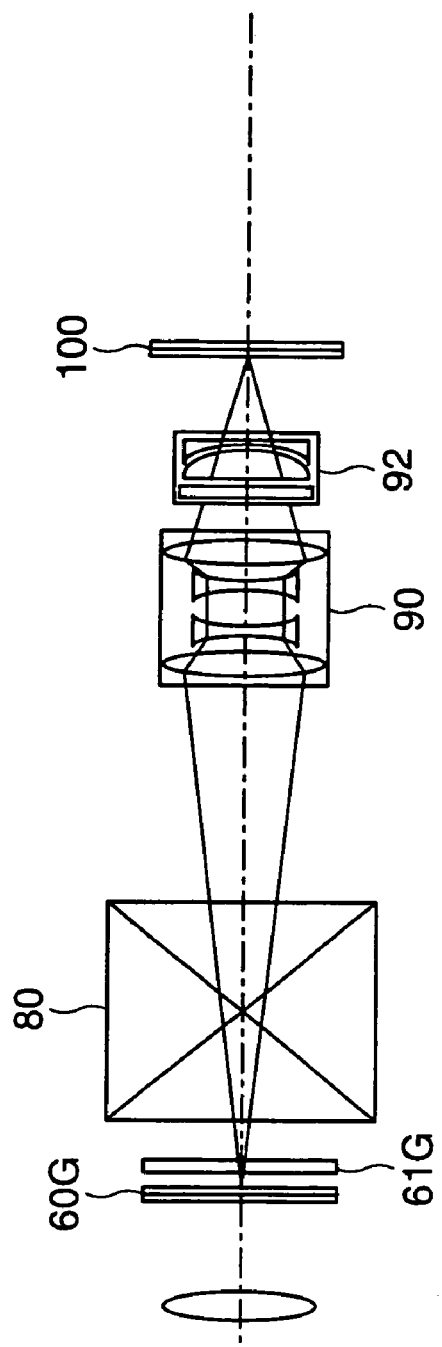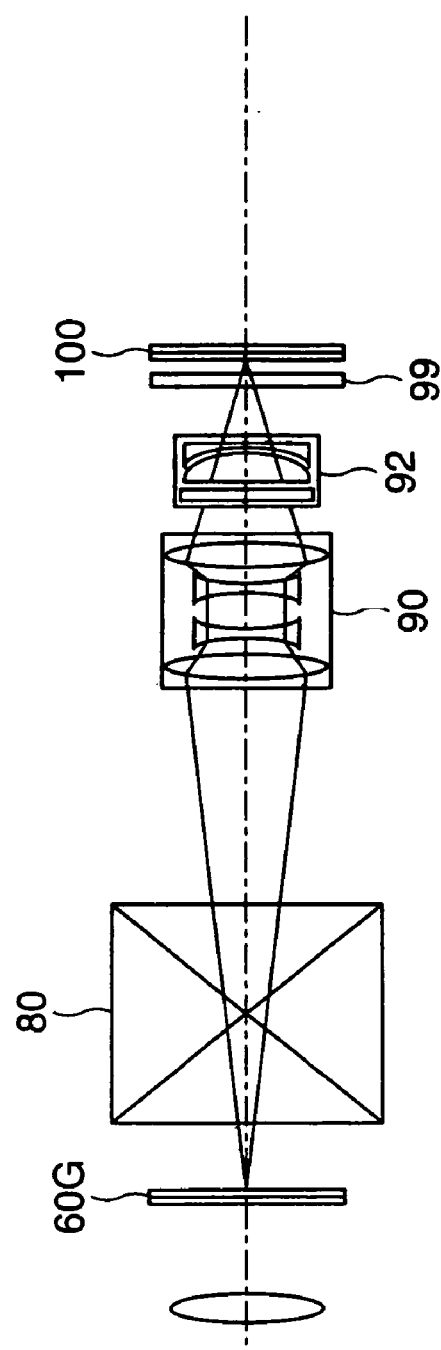
FIG. 6A
FIG. 6B

| CONTROL VALUE | 0 | 1 | 2 | 3 | 4 | 5 |
|---|---|---|---|---|---|---|
| TRANSMITTANCE | 0.003 | 0.006 | 0.009 | 0.012 | 0.017 | 0.025 |
| CONTROL VALUE | 6 | 7 | 8 | 9 | 10 | 11 |
| TRANSMITTANCE | 0.038 | 0.06 | 0.09 | 0.15 | 0.23 | 0.33 |
| CONTROL VALUE | 12 | 13 | 14 | 15 | | |
| TRANSMITTANCE | 0.44 | 0.52 | 0.57 | 0.6 | | |

420R

| CONTROL VALUE | 0 | 1 | 2 | 3 | 4 | 5 |
|---|---|---|---|---|---|---|
| TRANSMITTANCE | 0.004 | 0.007 | 0.010 | 0.013 | 0.018 | 0.026 |
| CONTROL VALUE | 6 | 7 | 8 | 9 | 10 | 11 |
| TRANSMITTANCE | 0.04 | 0.07 | 0.10 | 0.16 | 0.24 | 0.35 |
| CONTROL VALUE | 12 | 13 | 14 | 15 | | |
| TRANSMITTANCE | 0.45 | 0.52 | 0.57 | 0.6 | | |

FIG. 9

$T_{15} = (T_{11} \times 25 + T_{12} \times 5 + T_{13} \times 5 + T_{14} \times 1)/36$ $T_{19} = (T_{15} \times 1 + T_{16} \times 4 + T_{17} \times 4 + T_{18} \times 16)/25$

IMAGE DISPLAY APPARATUS, PROJECTOR, AND POLARIZATION COMPENSATION SYSTEM

RELATED APPLICATION

The Present application claims priority to Japanese Patent Application No. 2004-166947 filed Jun. 4, 2004, which is hereby expressly incorporated by reference herein in its entirety.

BACKGROUND

Aspects of the invention can relate to an image quality improvement technology of an image display apparatus. More specifically, aspects of the invention can relate to an optical configuration suitable for realizing expansion of dynamic range of display brightness and high gradation.

Image quality improvement in related art electronic display apparatuses, such as an LCD (Liquid Crystal Display), an EL (Electro-luminescence) display, a plasma display, a CRT (Cathode Ray Tube), and a projector can be remarkable and an apparatus having performances comparable to the human visual properties can be realized with respect to resolution and color gamut. However, with respect to the brightness dynamic range, its reproduced range remains on the order of 1 to $10^2$ [nit], and further, the number of gradations is generally 8 bits.

On the other hand, the human visual perception provides a brightness dynamic range that can be perceived at a time is on the order of $10^{-2}$ to $10^4$ [nit], and further, the brightness discriminative ability is on the order of 0.2 [nit]. This is said to be equal to 12 bits in terms of number of gradations. Seeing a display image of a current display apparatus through such visual properties, the human does not satisfy the reality and impact because the narrowness of the brightness dynamic range stands out and additionally, the gradations in shadow parts and highlight parts are insufficient.

Further, in computer graphics (CG) used for movies or games, the movement for pursuing description reality by providing display data (hereinafter, referred to as "HDR (High Dynamic Range) display data") with brightness dynamic range and gradation characteristics close to human visual perception is becoming the mainstream. However, there is a problem that powers of expression the CG contents originally have can not be exerted sufficiently because the performance of the display apparatus for displaying CG is insufficient.

Furthermore, in the next OS (Operative System), 16-bit color space is planned to be adopted, and the brightness dynamic range and the number of gradations will be increased dramatically compared to those in the current 8-bit color space. Accordingly, the demand for realization of an electronic display apparatus with high dynamic range and high gradation capable of utilizing the 16-bit color space is expected to be increased.

Among related art display apparatuses, projection display apparatuses (projectors), such as a liquid crystal projector and DLP (Digital Light Processing, registered trademark) projector, can perform large screen display and are effective apparatuses for reproducing the reality and impact of display images. In this field, the following proposals have been made in order to solve the above described problems.

As a display apparatus with high dynamic range, for example, there is a technology disclosed in, for example, Japanese Patent Application Publication 2001-100689. In the technology, a light source, a second light modulator device for modulating brightness of all wavelength regions of light, and a first light modulator device for modulating the brightness of the wavelength regions with respect to respective wavelength regions of RGB three primary colors of the wavelength regions of light are provided for forming a desired brightness distribution by modulating light from the light source by the second light modulator device, imaging the optical image thereof onto a display surface of the first light modulator device and performing color modulation, and projecting the secondary modulated light. The respective pixels of the second light modulator device and the first light modulator device are separately controlled based on the first control value and the second control value determined from the HDR display data, respectively. As the light modulator device, a transmittance modulator device having a pixel structure or segment structure with independently controllable transmittances and capable of controlling a two-dimensional transmittance distribution is used. As a representative example thereof, a liquid crystal light valve can be cited. Further, a reflectance modulator device may be used in place of the transmittance modulator device, and as a representative example thereof, a DMD (Digital Micromirror Device) can be cited.

Now, the case of using a light modulator device having a transmittance of dark display of 0.2% and a transmittance of bright display of 60% is considered. Regarding the light modulator device alone, the brightness dynamic range is 60/0.2=300. The display apparatus corresponds to the case where light modulator devices having the brightness dynamic range of 300 are optically and serially arranged, and thereby, the brightness dynamic range of 300×300=90000 can be realized. Further, the equal way of thinking is held with respect to the number of gradations, and the number of gradations exceeding 8 bits can be obtained by optically and serially arranging light modulator devices with 8-bit gradation.

However, in the technology of the Publication 2001-100689, since an optical image formed by one optical modulator device is transmitted to the other optical modulator device using an optical element for illumination system having large optical aberration, there is a problem that illumination light having a desired light intensity distribution is difficult to be transferred onto the other optical modulator device accurately.

SUMMARY

An aspect of the invention can provide an image display apparatus and projector suitable for realizing expansion of brightness dynamic range and high image quality of display images. Another aspect of the invention can provide a polarization compensation system preferably used for an image display apparatus intended for expansion of brightness dynamic range.

An exemplary apparatus according to a first aspect of the invention is an apparatus for displaying an image by modulating light from a light source based on display image data, and the apparatus can include a first light modulator device that modulates light from the light source, a second light modulator device that modulates the light from the first light modulator device, and a polarization compensation system disposed between the first light modulator device and the second light modulator device for compensating a polarization state of light.

In the above image display apparatus, the light from the light source can be modulated in two stages of the image forming process via the optically and serially arranged two light modulator devices. As a result, the image display apparatus can realize the expansion of brightness dynamic range and increase in number of gradations.

In the above image display apparatus, a relay lens can be provided between the first light modulator device and the second light modulator device, and thereby, optical aberration can be reduced. In other words, since the light from the first light modulator device can be transmitted to the second light modulator device with relatively high precision, the optical image modulated by the first light modulator device can be formed with higher precision than in the conventional one on one surface of the second light modulator device.

Here, in the case where the first light modulator device and the second light modulator device are formed by liquid crystal devices (liquid crystal light valves), in order to realize accurate dynamic range expansion, it is necessary that the light that has passed through the first light modulator device is transmitted to the second light modulator device while remaining in the polarization state without change. However, when polarized light passes through an optical element, such as a relay lens, because transmittances of P-polarized light and S-polarized light in the optical surface of the optical element are different, the vibration direction of the polarized light after passing through the optical element is shifted from that of the incident polarized light (rotation of vibration plane of light, polarization plate rotation). Further, although an antireflection film for raising the transmittance is generally formed on the optical surface of the optical element in the relay lens, when polarized light enters at an incident angle that is not a right angle with the antireflection film, the phase difference between the P-polarized component and S-polarized component changes due to multiple interaction within the film and the incident polarized light is turned into elliptically polarized light (retardation). Similarly, when another optical element is provided in the light path, the similar change in phase difference is possibly caused by the optical element. Further, as a total result of these changes in the polarization state, there is a possibility that brightness reduction and brightness variations occur in the display image and an inaccurate display condition in which brightness and gradation of the display image differ from the original image data is caused.

Contrary, in the above image display apparatus, because it has the polarization compensation system, even in the case where an optical element is provided between the first light modulator device and the second light modulator device, an originally desired polarization state can be maintained. Accordingly, display images with low brightness reduction and brightness variations and high dynamic range and advantageous gradation characteristics can be obtained.

By the way, as the light source, any medium that emit light can be used. For example, a light source having an optical system, such as a lamp built in may be used, or a light source utilizing external light, such as sunlight or interior light, may be used.

Further, as the light source, any light source, such as three light sources corresponding to the respective colors of RGB as three primary colors of light, may be used, for example, or a single light source that outputs white light may be used. Note that, when the white light source is used, a light separating unit that separates three colors of light for representing colors of the display image from the white light is required.

In the above image display apparatus, it is preferable that, when a light separating unit that separates the light from the light source into lights in plural specific different wavelength regions, performance of the polarization compensation system is designed in response to the respective visibility of the lights in plural specific wavelength regions.

Further, specifically, for example the polarization compensation system is designed so as to express the highest compensation performance to the light with the highest visibility of the lights in plural specific wavelength regions.

For example, when the lights in plural specific wavelength regions are three lights corresponding to respective colors of red (R), green (G), and blue (B), the polarization compensation system is preferably designed so as to express the highest compensation performance to the green light (G light) of the three lights. By minimizing the polarization change in the region with the highest visibility of human, the display image quality can be improved most effectively.

Further, specifically, for example, the polarization compensation system includes a dielectric film having a polarization compensation function. By the dielectric film, retardation and rotation of vibration plane (polarization plane rotation) of the polarized light can be principally compensated.

Further, specifically, for example, the polarization compensation system includes a rectifier, and the rectifier includes a half-wave plate and a lens with no refractive power. By the rectifier, the rotation of vibration plane (polarization plane rotation) of the polarized light can be principally compensated.

Further, in the above image display apparatus, one polarizer of a first polarizer disposed on a light-exiting surface side of the first light modulator device and a second polarizer disposed on a light-incident surface side of the second light modulator device may be omitted. By the configuration, the number of provided polarizers becomes smaller and the simplification and cost reduction of the apparatus configuration can be further achieved.

An exemplary apparatus according to a second aspect of the invention is a projector that can include the above image display apparatus, and a projecting unit. In the projector, because it includes the image display apparatus advantageous in expansion of brightness dynamic range and high image quality of display images, by large screen display, the reality and impact of the display image can be effectively reproduced.

An exemplary apparatus according to a third aspect of the invention is an optical system that compensates a polarization state of light and disposed between two light modulator devices optically and serially arranged. Specifically, the above polarization compensation system preferably includes at least one of a dielectric film having a polarization compensation function and a rectifier. The polarization compensation system can be preferably used in the image display apparatus in which expansion of brightness dynamic range and high image quality of display images are achieved.

BRIEF DESCRIPTION OF THE DRAWINGS

The invention will be described with reference to the accompanying drawings, wherein like numbers reference like elements, and wherein:

FIGS. 5 and 5C-5F show explanatory diagrams schematically showing, in the case where the rectifier is provided, how the polarization state changes after polarized light exits from the color modulation light valve before entering the brightness modulation light valve;

FIG. 6A shows a configuration example in which the light-incident side polarizer of the brightness modulation light valve is omitted;

FIG. 6B shows a configuration example in which the light-exiting side polarizer of the color modulation light valve is omitted;

FIG. 9 shows an exemplary data structure of a control value registration table;

DETAILED DESCRIPTION OF PREFERRED EMBODIMENTS

Hereinafter, exemplary embodiment examples of the invention will be described according to the drawings.

Figure 1:
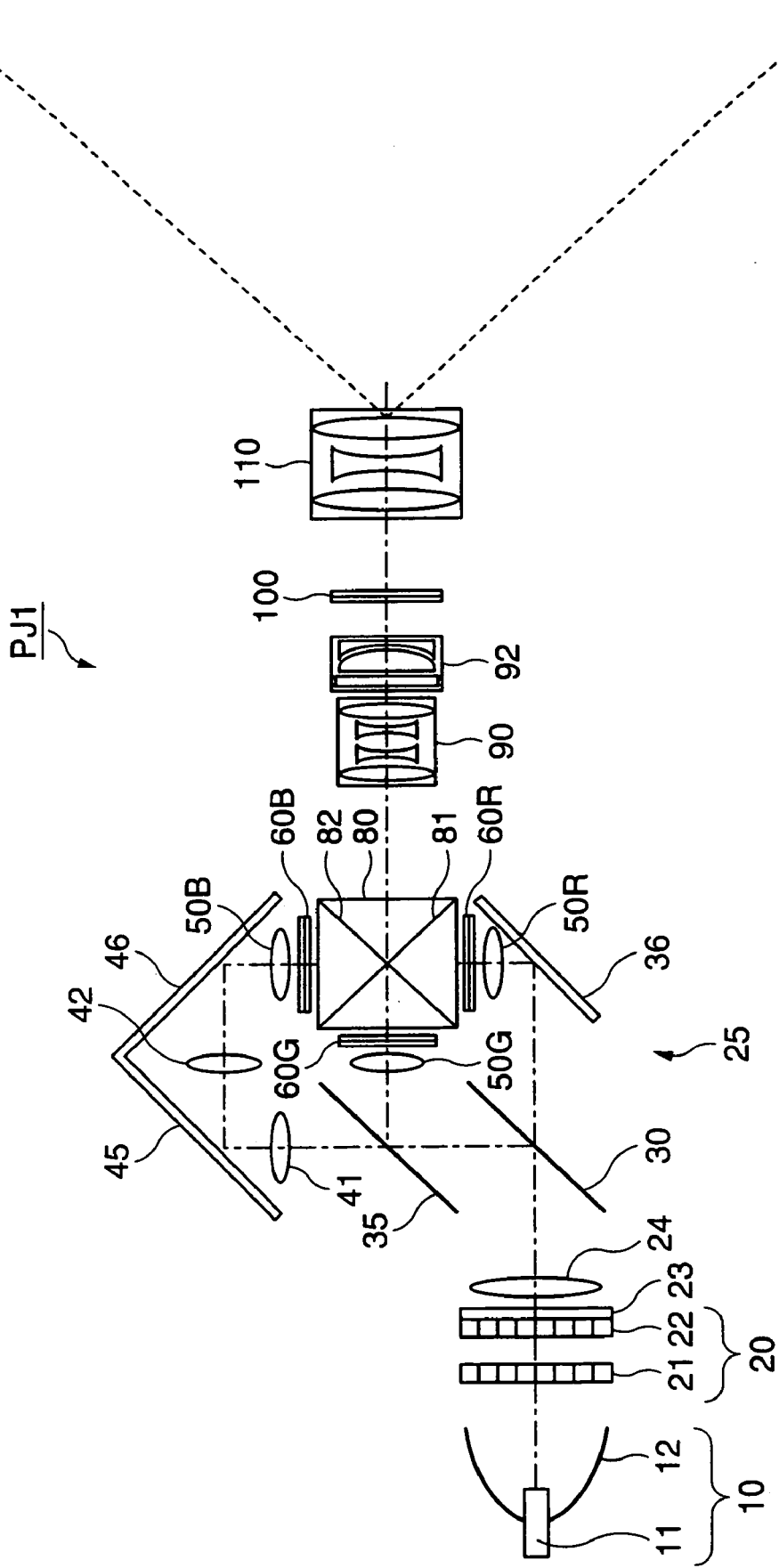
FIG. 1 shows a principal optical configuration of an image display apparatus (projector) according to the invention.

FIG. 1 shows an example of embodiments of an image display apparatus of the invention and a projector of the invention, and a principal optical configuration of a projector PJ1. As shown in FIG. 1, the projector PJ1 includes a light source 10, a uniform illumination system 20 that uniformizes the brightness distribution of light incident from the light source 10, a color modulating unit 25 (including three transmissive liquid crystal light valves 60B, 60G, and 60R as a first modulating unit) that respectively modulates the brightness of RGB three primary colors in the wavelength regions of the light incident from the uniform illumination system 20, a relay lens 90 that relays the light incident from the color modulating unit 25, a rectifier 92 as a polarization compensation system, a transmissive liquid crystal light valve 100 as a second modulating unit that modulates the brightness of all wavelength regions of the light incident from the relay lens 90, and a projection lens 110 that projects the light incident from the liquid crystal light valve 100 onto a screen (not shown).

The light source 10 can include a lamp 11 of an ultrahigh pressure mercury lamp, xenon lamp, or the like, and a reflector 12 that reflects and condenses the exiting light from the lamp 11.

The uniform illumination system 20 can include two lens arrays 21 and 22 of fly-eye lenses or the like, a polarization conversion element 23, and a condenser lens 24. The system uniformizes the light intensity distribution of the light from the light source 10 by the two lens arrays 21 and 22, polarizes the uniformized light in an incidentable polarization direction of the color modulating unit 25 by the polarization conversion element 23, condenses the polarized light by the condenser lens 24, and outputs the light to the color modulating unit 25. The polarization conversion element 23 can be formed by a PBS array and a half-wave plate for converting randomly polarized light into specific linearly polarized light.

The color modulating unit 25 can include two dichroic mirrors 30 and 35 as a light separating unit, three mirrors (reflection mirrors 36, 45, and 46), five field lenses (a lens 41, a relay lens 42, and parallelizing lenses 50B, 50G, and 50R), the three liquid crystal light valves 60B, 60G, and 60R, and a cross dichroic prism 80.

The dichroic mirrors 30 and 35 are for separating (spectroscopically separating) the light (white light) from the light source 10 into RGB three primary color lights of red (R), green (G), and blue (B). The dichroic mirror 30 includes a dichroic film having a nature of reflecting B light and G light and transmitting R light formed on a glass plate or the like, and, with respect to the white light from the light source 10, reflects B light and G light and transmits R light, which are contained in the white light. The dichroic mirror 35 includes a dichroic film having a nature of reflecting G light and transmitting B light formed on a glass plate or the like, and reflects the G light of the G light and B light transmitted through the dichroic mirror 30 and transfers the light to the parallelizing lens 50G and transfers the blue light and transmits the light to the lens 41.

The relay lens 42 is for transferring light (light intensity distribution) in the vicinity of the lens 41 to the vicinity of the parallelizing lens 50B, and the lens 41 has a function of allowing light efficiently enter the relay lens 42. The B light incident to the lens 41 is transferred to the spatially separated liquid crystal light valve 60B in a condition in which the intensity distribution thereof is nearly completely conserved with little light loss.

The parallelizing lenses 50B, 50G, and 50R have a function of substantially parallelizing the respective color lights incident to the liquid crystal light valves 60B, 60G, and 60R to narrow the angle distribution of the incident lights for improving the display characteristics of the liquid crystal light valves 60B, 60G, and 60R. Then, the RGB three primary color lights spectroscopically separated by the dichroic mirrors 30 and 35 enter the liquid crystal light valves 60B, 60G, and 60R via the above described mirrors (reflection mirrors 36, 45, and 46) and field lenses (the lens 41, relay lens 42, and parallelizing lenses 50B, 50G, and 50R).

The liquid crystal light valves 60B, 60G, and 60R are active matrix liquid crystal display devices including TN type liquid crystal sandwiched between a glass substrate on which pixel electrodes and switching elements for driving the electrodes such as thin film transistor elements and thin film diodes are formed in a matrix form and a glass substrate on which a common electrode is formed over the entire surface, and polarizers disposed on the outer surfaces thereof.

Further, the liquid crystal light valves 60B, 60G, and 60R are driven in the normally white mode in which they take white/bright (transmitting) condition when no voltage is applied and black/dark (non-transmitting) condition when a voltage is applied, or driven in the normally black mode as the inverse mode thereof. The gradation between bright and dark is analog controlled according to the provided control values. The liquid crystal light valve 60B performs light modulation on the incident B light based on the display image data and outputs the modulated light including an optical image. The liquid crystal light valve 60G performs light modulation on the incident G light based on the display image data and outputs the modulated light including an optical image. The liquid crystal light valve 60R performs light modulation on the incident R light based on the display image data and outputs the modulated light including an optical image.

The cross dichroic prism 80 has a structure in which four right angle prisms are bonded, and, within the structure, a dielectric multilayer film reflecting B light (B light reflection dichroic film 81) and a dielectric multilayer film reflecting R light (R light reflection dichroic film 82) are formed to have an X-shaped section. The prism transmits the G light from the liquid crystal light valve 60G and bends the R light from the liquid crystal light valve 60R and the B light from the liquid crystal light valve 60B, and combines these three color lights to form a color image.

The relay lens 90 is for transferring the optical image (light intensity distribution) from the liquid crystal light valves 60B, 60G, and 60R combined by the cross dichroic prism 80 onto the display surface of the liquid crystal light valve 100.

Figure 2:
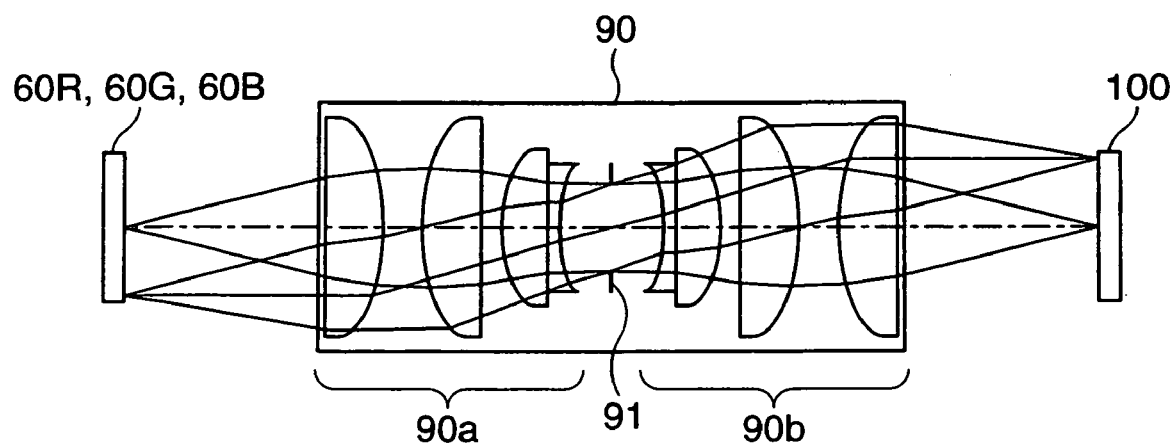
FIG. 2 shows a configuration of a relay lens.

FIG. 2 shows an exemplary configuration of the relay lens 90. The relay lens 90 is for forming the optical image of the liquid crystal light valves 60B, 60G, and 60R for modulation of the respective colors on a pixel surface of the liquid crystal light valve 100. As shown in FIG. 2, the lens is an equal magnification imaging lens including a former part lens group 90*a* and a latter part lens group 90*b* disposed nearly symmetrically relative to an aperture stop 91. Further, in consideration of viewing angle characteristics of liquid crystal, the lens desirably has a both-side telecentric property. The former part lens group 90*a* and latter part lens group 90*b* include plural convex lenses and concave lenses. Note that the shape, size, arrangement space, and number, telecentricity, magnification of lenses, and other lens properties can be appropriately changed according to the required properties and not limited to the example in FIG. 2. Since the relay lens 90 can be formed from a large number of lenses, it can provide good aberration correction and transfer the brightness distribution formed by the liquid crystal light valves 60B, 60G, and 60R for modulation of the respective colors accurately to the liquid crystal light valve 100.

Returning to FIG. 1, the rectifier 92 is for compensating the changes in the polarization state produced between the liquid crystal light valves 60B, 60G, and 60R as the first light modulator device and the liquid crystal light valve 100 as the second light modulator device. By the rectifier 92, in the optical path between the liquid crystal light valves 60B, 60G, and 60R and the liquid crystal light valve 100, an originally desired polarization state can be maintained. The configuration and function of the rectifier 92 will be described in greater detail below.

The liquid crystal light valve 100 has a configuration equal to that of the above described liquid crystal light valves 60B, 60G, and 60R, and modulates the brightness of all wavelength regions of the incident light based on the display image data and outputs the modulated light including the final optical image to the projection lens 110. The projection lens 110 projects the optical image of the liquid crystal light valve 100 onto the screen (not shown) to display a color image.

Here, the liquid crystal light valves 60B, 60G, and 60R and liquid crystal light valve 100 are the same in the point where they modulate intensity of transmitted light and include optical images in response to the degrees of the modulation, however, they are different in the point where the latter liquid crystal light valve 100 modulates light (white light) of all wavelength regions, while the former liquid crystal light valves 60B, 60G, and 60R modulate lights of specific wavelength regions (color lights of R, G, and B or the like) spectroscopically separated by the dichroic mirrors 30 and 35 as the light separating unit. Therefore, for convenience, they are discriminated by referring to the light intensity modulation performed by the liquid crystal light valves 60B, 60G, and 60R as color modulation and the light intensity modulation performed by the liquid crystal light valve 100 as brightness modulation.

Further, from the same point of view, in the description as below, they are discriminated by referring to the liquid crystal light valves 60B, 60G, and 60R as color modulation light valves and the liquid crystal light valve 100 as brightness modulation light valve. The contents of control data input to the color modulation light valves and the brightness modulation light valve will be described later in detail. Note that, in the exemplary embodiment, the color modulation light valves have higher resolution than the brightness modulation light valve, and thus, the case where the color modulation light valves determine the display resolution (referring to the resolution sensed by an observer when the observer see the display image of the projector PJ1) is assumed. Regardless to add, it should be understood that the relation of the display resolution is not limited to that, but it is possible the brightness modulation light valve determines the display resolution.

Next, the overall flow of light transfer in the projector PJ1 will be described. The white light from the light source 10 is spectroscopically separated into three primary color lights of red (R), green (G), and blue (B) by the dichroic mirrors 30 and 35, and allowed to enter the liquid crystal light valves 60B, 60G, and 60R via the lens including the parallelizing lenses 50B, 50G, and 50R and the mirrors. The respective color lights incident to the liquid crystal light valves 60B, 60G, and 60R are color modulated based on external data depending on the respective wavelength regions, output as modulated lights including optical images. The modulated lights from the liquid crystal light valves 60B, 60G, and 60R respectively enter the cross dichroic prism 80, are combined into one light there, and allowed to enter the liquid crystal light valve 100 via the relay lens 90 and rectifier 92. The combined light incident to the liquid crystal light valve 100 is brightness modulated based on the external data depending on all wavelength regions, and output to the projection lens 110 as modulated light including the final optical image. Then, in the projection lens 110, the final combined light from the liquid crystal light valve 100 is projected on the screen (not shown) to display a desired image.

Thus, in the projector PJ1, the form in which the modulated lights including the optical images (images) formed by the liquid crystal light valves 60B, 60G, and 60R as the first light modulator device are used for forming the final display image by the liquid crystal light valve 100 as the second light modulator device is adopted. The light from the light source 10 can be modulated in the two stages of the image forming process via the serially arranged two light modulator devices (the color modulation light valves and brightness modulation light valve). As a result, the projector PJ1 can realize the expansion of brightness dynamic range and increase in number of gradations.

Further, in the projector PJ1, since the liquid crystal light valve 100 as the second light modulator device is located via the relay lens 90 in the subsequent stage of the liquid crystal light valves 60B, 60G, and 60R as the first light modulator device and the cross dichroic prism 80, the number of optical elements arranged between the two light modulator devices can be made smaller than the related art similar optical system in which the liquid crystal light valve 100 is located in the preceding stage of the dichroic mirrors 30 and 35 and the liquid crystal light valves 60B, 60G, and 60R. As a result, the distance between the two light modulator devices can be made relatively short, and thereby, the optical aberration of the transferred light can be reduced and imaging (transfer) accuracy can be improved.

Here, in order to realize accurate dynamic range expansion, the light that has passed through the liquid crystal light valves 60B, 60G, and 60R as the first light modulator device is required to be transferred remaining in the polarized condition without change to the liquid crystal light valve 100 as the second light modulator device. Accordingly, in the projector PJ1, as described above, by the rectifier 92 as the polarization compensation optical system, in the optical path between the liquid crystal light valves 60B, 60G, and 60R and the liquid crystal light valve 100, an originally desired polarization state can be maintained.

Figure 3:
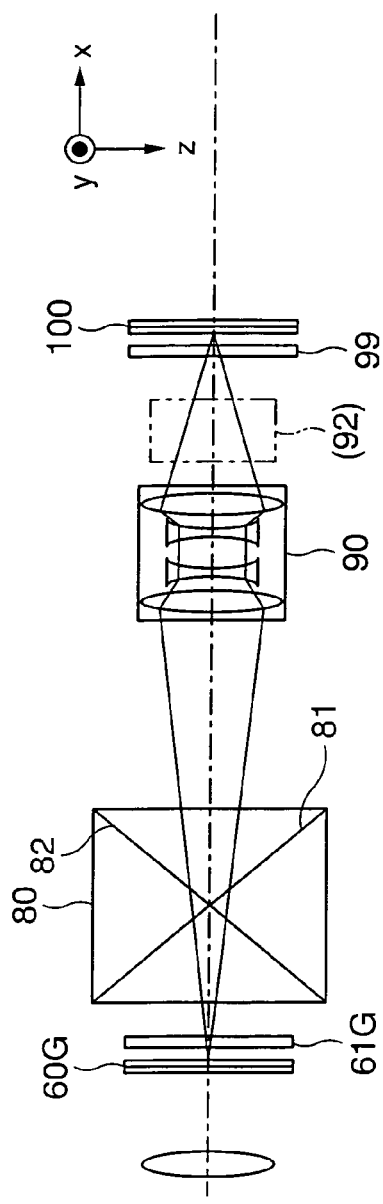
FIGS. 3 and 3A-3C show an explanatory diagrams schematically showing, in the case where there is no rectifier, how the polarization state changes after polarized light exits from the color modulation light valve before entering a brightness modulation light valve.

Next, the configuration and function of the rectifier 92 (polarization compensation system) will be described in detail using FIGS. 3 to 5. FIG. 3 is an explanatory diagram schematically showing, in the case where there is no rectifier, how the polarization state changes after the polarized light exits from the color modulation light valve (liquid crystal light valve 60G) before entering the brightness modulation light valve (liquid crystal light valves 100).

To make the description easier to understand, FIG. 3 shows only the change of the polarized light exiting from the central part of the G color modulation light valve, however, nearly equal changes occur qualitatively with respect to the polarized lights exiting from the R and B color modulation light valves (liquid crystal light valves 60R and 60B shown in FIG. 1) and other parts than the central parts. Further, the polarization state in the drawing has been exaggeratingly depicted to make the qualitative description easy to understand, and the real change in the polarization state is smaller compared to the state shown in the drawing.

Figure 3C:
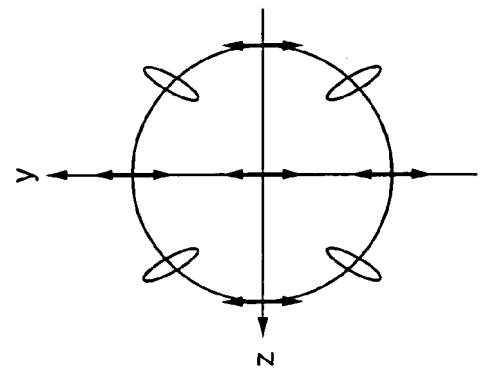
Figure 3B:
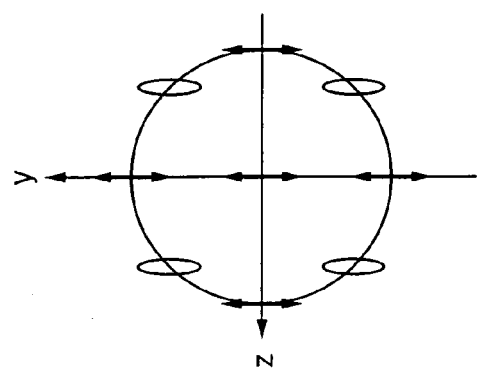
Figure 3A:
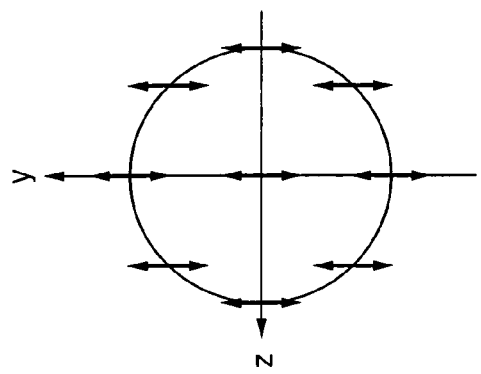

As shown in the configuration diagrams of the optical system in FIGS. 3A to 3C, a light-exiting side polarizer 61G is disposed on the light-exiting side of the color modulation light valve 60G and a light-incident side polarizer 99 is disposed on the light-incident side of the brightness modulation light valve 100, and polarized light transmission axes of these are oriented in the y axis direction. The polarization state of the luminous flux immediately after exiting from the light-exiting side polarizer 61G is shown in FIG. 3A. In this stage, all polarization axes are parallel with the y axis within the luminous flux section.

Then, the luminous flux is transmitted through the R light reflection surface and B light reflection surface of the cross dichroic prism 80 and exits from the cross dichroic prism 80. Since the dielectric multilayer films (the B light reflection dichroic film 81 and R light reflection dichroic film 82) are formed on the R light reflection surface and B light reflection surface, retardation occurs in the P-polarized component and S-polarized component of the polarized luminous flux transmitted through the surfaces and the linearly polarized light is turned into elliptically polarized light. The polarization state of the luminous flux immediately exiting from the cross dichroic prism 80 is shown in FIG. 3B. Note that, in FIG. 3B, polarized lights on the y axis and z axis do not vary. This is because these beams on the axes have only one of the P-polarized component and S-polarized component with respect to the R light reflection surface and B light reflection surface.

Then, the luminous flux is transmitted through the respective lens surfaces that form the relay lens 90 and exits from the relay lens 90. Since transmittance differences are produced in the P-polarized component and S-polarized component on the respective lens surfaces of the relay lens 90, the polarization plane rotates (rotation of vibration plane of light). Furthermore, since antireflection coatings of dielectric multilayer films for improvement in transmittances are applied to the respective lens surfaces of the relay lens 90, retardation occurs in the P-polarized component and S-polarized component of the polarized luminous flux transmitted through the surfaces and the degree of elliptically polarized light further increases. The polarization state of the luminous flux immediately exiting from the relay lens 90 is shown in FIG. 3C. Note that, in FIG. 3C, polarized lights on the y axis and z axis do not vary. This is because these beams on the axes have only one of the P-polarized component and S-polarized component with respect to the respective lens surfaces.

When the luminous flux in the polarization state in FIG. 3C enters the light-incident side polarizer 99, because the light-incident side polarizer 99 transmits only the polarized light in the y axis direction, compared to the case where the luminous flux in the originally desired polarization state in FIG. 3A enters, the amount of transmitted light is reduced. Further, since a difference is produced in the polarization state in FIG. 3C depending on the position where the luminous flux exits from the color modulation light valve 60G, differences are produced in the amounts of transmitted light with respect to each part of the color modulation light valve 60G and brightness variations are produced.

Figure 4:
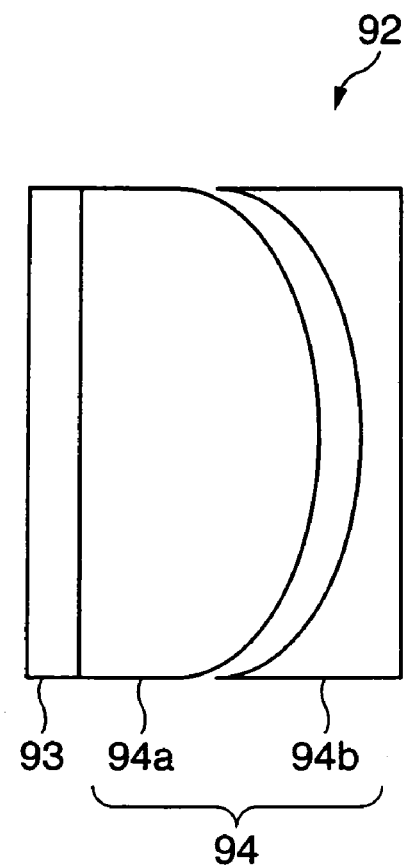
FIG. 4 is a schematic configuration diagram of a rectifier.

FIG. 4 is a schematic configuration diagram of the rectifier 92. The rectifier 92 is formed by a half-wave plate ($\lambda/2$ plate 93) and a lens 94 with no refractive power. The lens 94 with no refractive power is formed by a combination of a pair of convex lens 94a and concave lens 94b having strong refracting surfaces. The function of the $\lambda/2$ plate 93 will be described below. The lens 94 with no refractive power can produce a transmittance difference between the P-polarized component and S-polarized component of the transmitted beam and rotate the polarization plane. By adjusting the radius of curvature and the glass refractive index of the curved surface, the degree of rotation of the polarization can be adjusted over a broad range. Further, by forming dielectric multilayer films that produces desired retardation on the surface of the $\lambda/2$ plate 93 and the respective surfaces of the lens 94 with no refractive power, desired retardation can be provided to the transmitted beam.

Figure 5:
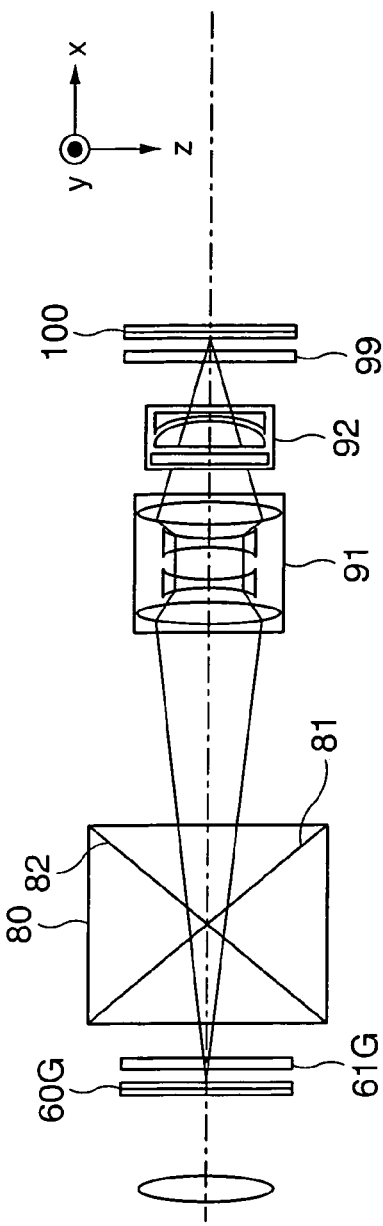
Figure 5:
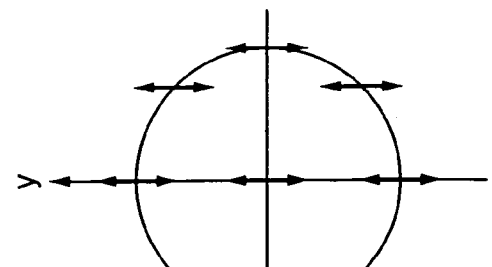
Figure 5:
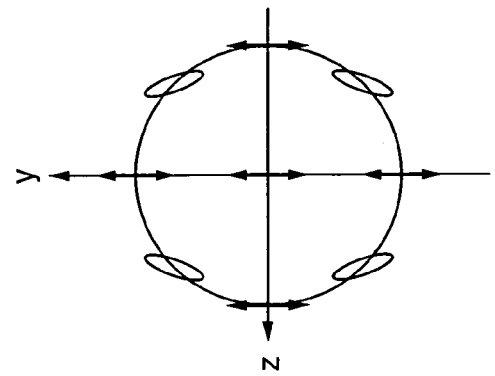
Figure 5:
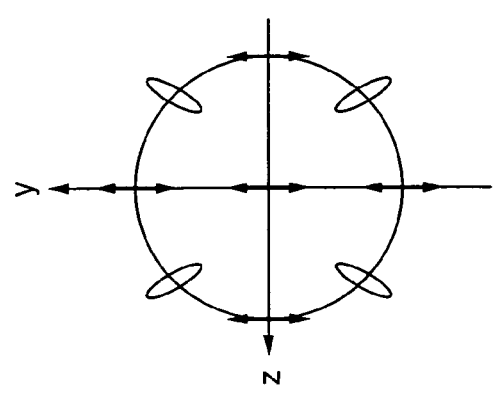

FIG. 5 is an explanatory diagram schematically showing, in the case where the rectifier 92 is provided, how the polarization state changes after the polarized light exits from the color modulation light valve 60G before entering the brightness modulation light valve 100.

FIG. 5C is a polarization state of the luminous flux immediately after exiting from the relay lens 90. This polarization state is produced by the retardation in the cross dichroic prism 80 and the relay lens 90 and the polarization plane rotation action in the relay lens 90 as described in FIG. 3.

Now, assuming that the optical axis of the $\lambda/2$ plate 93 of the rectifier 92 is parallel with the y axis direction, the polarization state of the luminous flux after transmitted through the $\lambda/2$ plate 93 becomes as shown in FIG. 5D, and the principal axis of the elliptically polarized light rotates relative to the polarization state in FIG. 5C.

Since the lens 94 with no refractive power causes nearly the same polarization plane rotation as the polarization plane rotation produced in the relay lens 90 by adjusting the radius of curvature and the glass refractive index of the curved surface, in the polarization state of the luminous flux transmitted through the lens 94, the principal axis of the elliptically polarized light returns to be nearly in parallel with the y axis as shown in FIG. 5E.

Further, because of the retardation of the dielectric film formed on at least one surface of the respective surfaces of the λ/2 plate 93 and the lens 94 with no refractive power, the elliptically polarized light returns to linearly polarized light.

As a result, as shown in FIG. 5F, the polarization state of the luminous flux exiting from the rectifier 92 returns to nearly the same state as the polarization state of that immediately after exiting from the light-exiting side polarizer 61G in FIG. 3A, improvement in the amount of transmitted light and reduction of the brightness variations can be achieved compared to the case where the rectifier 92 is not inserted.

As above, the polarized light exiting from the G color modulation light valve 60G has been described as an example, however, nearly the same description is applicable to the polarized lights output from the R and B color modulation light valves (the liquid crystal light valves 60R and 60B shown in FIG. 1).

Here, the polarization changes caused by the exiting polarized lights of the respective colors of R, G, and B transmitted through the cross dichroic prism 80 and the relay lens 90 are not completely the same. In the cross dichroic prism 80, G light is transmitted through the R light reflection surface and B light reflection surface. The R light is reflected by the R light reflection surface and transmitted through the B light reflection surface. The B light is transmitted through the R light reflection surface and reflected by the B light reflection surface. Therefore, the retardation to which the respective color lights are subjected by the dielectric multilayer films (the B light reflection dichroic film 81 and R light reflection dichroic film 82) of the R light reflection surface and B light reflection surface is different. Further, in the relay lens 90, due to chromatic dispersion of glass refractive index, the degrees of rotation of polarization plane are different with respect to each color light. For the reasons mentioned above, it is difficult for the rectifier 92 to return the polarization changes completely to the original over the all wavelength regions, and there is a possibility that the realization thereof causes upsizing, complexity, significant cost increase of the polarization compensation system.

Accordingly, in this example, the rectifier 92 is arranged so as to minimize the polarization state of G light that provide the highest visibility of human. Specifically, the dielectric multilayer films of the rectifier 92, the radius of curvature and glass material of the lens 94 with no refractive power are adjusted so that the retardation and polarization plane rotation to which G light is subjected may be minimized. Thus, the display image quality can be improved most effectively while avoiding the upsizing, complexity, cost increase of the polarization compensation system (rectifier 92). By the way, in the case where a mercury lamp such as an ultrahigh pressure mercury lamp is used as the light source 10 (see FIG. 1), retardation and polarization plane rotation are desirably minimized at the vicinity of the e line (546.1 nm) having the highest intensity in the G light wavelength region.

In the example, the dielectric multilayer film for compensation of retardation occurring in the cross dichroic prism 80 and the relay lens 90 is formed on at least one surface of the optical element that forms the rectifier 92, however, it should be understood that the position in which the dielectric multilayer film is formed is not limited to that in the rectifier 92, but it may be formed on the surface of other optical element as long as the element functions equally. Specifically, the light exiting surface of the cross dichroic prism 80 and the respective lens surfaces of the relay lens 90 can be cited. Furthermore, antireflection films are normally applied to these surfaces, however, retardation for compensation can be produced effectively by forming no antireflection film on at least one surface of these surfaces.

Further, it should be understood that the position in which the rectifier 92 is located not limited in the latter part (light exiting side) of the relay lens 90 but it may be located in the former part (light incident side) of the relay lens 90. In this case, for example, the lens 94 with no refractive power may be located in the former part and the λ/2 plate 93 may be located in the latter part of the rectifier 92 described in FIG. 4.

Further, the polarization state immediately after exiting from the light-exiting side polarizer 61G (see FIG. 3A) and the polarization state before incident to the light-incident side polarizer 99 (see FIG. 5F) become substantially equal, one of the polarizers can be omitted.

In other words, as shown in FIG. 6A, the configuration in which the light-incident side polarizer of the brightness modulation light valve (liquid crystal light valve 100) is omitted and as shown in FIG. 6B, the configuration in which the light-exiting side polarizer of the color modulation light valve (liquid crystal light valve 60G) is omitted can be adopted. Note that, in FIGS. 6A and 6B, only the G light path is depicted for explanation, however, these configurations are equal with respect to R and B light paths. Generally, the transmittance of a polarizer is 80 to 90% with respect to transmitted polarized light, and the effect that the brightness of projection image is improved can be obtained by omitting the polarizer in both configurations in FIGS. 6A and 6B. In the configuration in FIG. 6A, since the optimal light-exiting side polarizer can be used with respect to each color, there are merits that the brightness and contrast characteristics of display images are advantageous. In the configuration in FIG. 6B, since total three light-exiting side polarizers of the respective colors can be omitted, there are merits that the configuration is simplified and cost reduction effect is great.

Next, specific examples of modulation by the color modulation light valves and brightness modulation light valve based on the display image data will be described in detail. In the projector PJ1 (see FIG. 1), the expansion of brightness dynamic range and increase in number of gradations can be realized by driving the color modulation light valves (the liquid crystal light valves 60B, 60G, and 60R shown in FIG. 1) with color modulation signals produced from video signals and brightness modulation light valve (the liquid crystal light valve 100 shown in FIG. 1) with brightness modulation signals. The modulation control of the liquid crystal light valves is performed by a display control device (the display control device 200), which will be described as below.

Figures 7, 8:
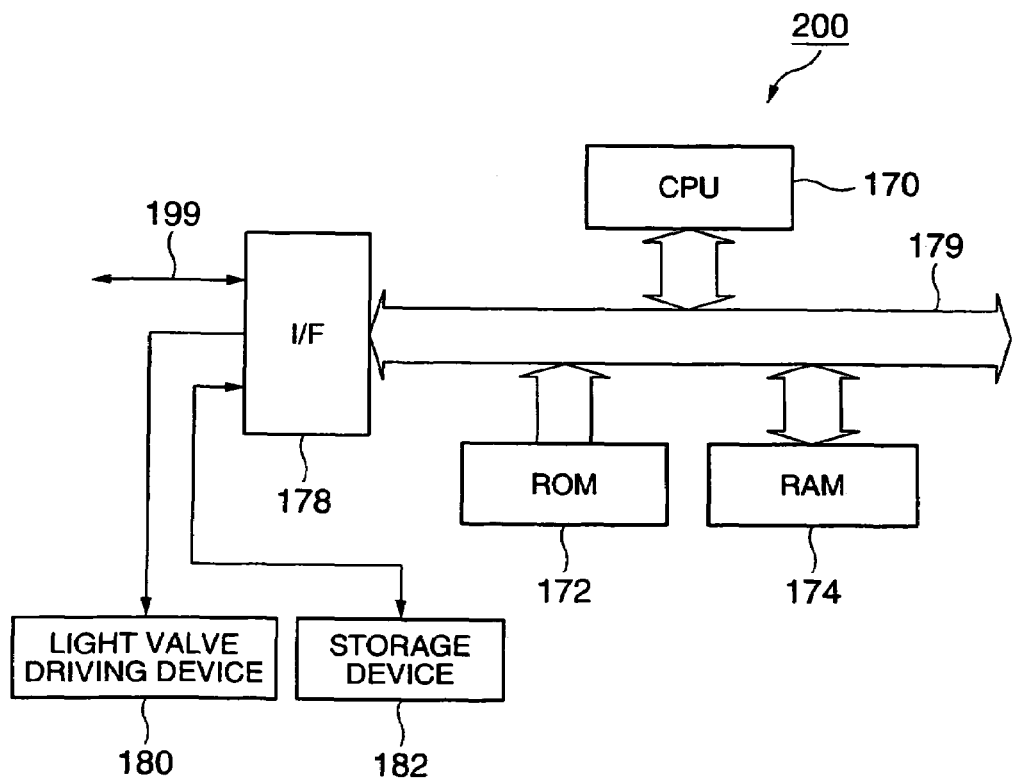
FIG. 7 is an exemplary block diagram showing a hardware configuration of a display control device.
FIG. 8 shows an exemplary data structure of a control value registration table.

FIG. 7 is a block diagram showing a hardware configuration of a display control device 200. As shown in FIG. 7, the display control device 200 includes a CPU 170 that performs calculation and control of the entire system based on control programs, a ROM 172 that has stored the control programs of the CPU 170 etc. in a predetermined area, a RAM 174 for storing data read from the ROM 172 etc. and calculation results required in the calculation process of the CPU 170, and an I/F 178 that transmits the data input to and data output from external devices, and these are connected to one another so that data can be transmitted and received by a bus 179 as a signal line for transferring data.

To the I/F 178, as external devices, a light valve driving device 180 that drives the brightness modulation light valve (the liquid crystal light valve 100 shown in FIG. 1) and color modulation light valves (the liquid crystal light valves 60B, 60G, and 60R shown in FIG. 1), a storage device 182 that stores data, tables, etc. as files, and a signal line for connection to an external network 199 are connected.

The storage device 182 has stored HDR display data for driving the brightness modulation light valve and color modulation light valves. The HDR display data is image data that can realize high brightness dynamic range, which can not be realized by the conventional image format of sRGB or the like, and the data has stored pixel values representing brightness levels of pixels with respect to all pixels. In the embodiment, as the HDR display data, a format in which pixel values with respect to each of RGB three primary colors for the one pixel are stored as floating point values is used. For example, as a pixel value of one pixel, the value (1.2, 5.4, 2.3) is stored.

Here, assuming that the brightness level of pixel p in the HDR display data is Rp, the transmittance of a pixel of the second light modulator device corresponding to the pixel p is T1, and the transmittance of a pixel of the first light modulator device corresponding to the pixel p is T2, the following equations (1) and (2) hold.

$$Rp = Tp \times Rs \quad (1)$$

$$Tp = T1 \times T2 \times G \quad (2)$$

Note that, in the above equations (1) and (2), Rs is brightness of the light source, G is a gain, and both are constants. Further, Tp is a percentage modulation of light.

Details about a method of generating HDR display data are disclosed in the publicly known document 3, P. E. Debevec and J. Malik, "Recovering High Dynamic Range Radiance Maps from Photographs", Proceedings of ACM SIG-GRAPH97, pp. 367-378 (1997), which is incorporated herein by reference in its entirety.

Further, the storage device 182 has stored a control value registration table 400 in which control values of the brightness modulation light valve are registered.

FIG. 8 shows a data structure of the control value registration table 400. In the control value registration table 400, as shown in FIG. 8, one record is registered with respect to each control value of the brightness modulation light valve. Each record includes a field in which the control values of the brightness modulation light valve are registered and a field in which the transmittances of the brightness modulation light valve are registered.

In the example in FIG. 8, "0" as a control value and "0.003" as a transmittance are respectively registered in the first record. This shows that, when the control value "0" is output to the brightness modulation light valve, the transmittance of the brightness modulation light valve becomes 0.3%. FIG. 8 shows an example in the case where the number of gradations of the brightness modulation light valve is 4 bits (0 to 15 value), however, actually, records corresponding to the number of gradations of the brightness modulation light valve are registered. For example, when the number of gradations is 8 bits, 256 records are registered.

Further, the storage device 182 has stored control value registration tables in which control values of the color modulation light valves are registered with respect to each color modulation light valve.

FIG. 9 shows a data structure of a control value registration table 420R in which control values of the liquid crystal light valve 60R are registered. In the control value registration table 420R, as shown in FIG. 9, one record is registered with respect to each control value of the liquid crystal light valve 60R. Each record includes a field in which the control values of the liquid crystal light valve 60R are registered and a field in which the transmittances of the liquid crystal light valve 60R are registered.

In the example in FIG. 9, "0" as a control value and "0.004" as a transmittance are respectively registered in the first record. This shows that, when the control value "0" is output to the liquid crystal light valve 60R, the transmittance of the liquid crystal light valve 60R becomes 0.4%. FIG. 9 shows an example in the case where the number of gradations of the color modulation light valve is 4 bits (0 to 15 value), however, actually, records corresponding to the number of gradations of the color modulation light valve are registered. For example, when the number of gradations is 8 bits, 256 records are registered.

Further, the data structures of the control value registration tables corresponding to the liquid crystal light valves 60B and 60G are not shown specifically, however, they have the same data structure as that of the control value registration table 420R. Note that, they are different from the control value registration table 420R in the point where different transmittances are registered for the same control value.

Next, the configuration of the CPU 170 and the processing executed by the CPU 170 will be described. The CPU 170 is formed by a micro processing unit (MPU) etc., and arranged so as to activate a predetermined program stored in a predetermined area of the ROM 172 and execute display control processing shown in the flowchart in FIG. 10 according to the program.

Figure 10:
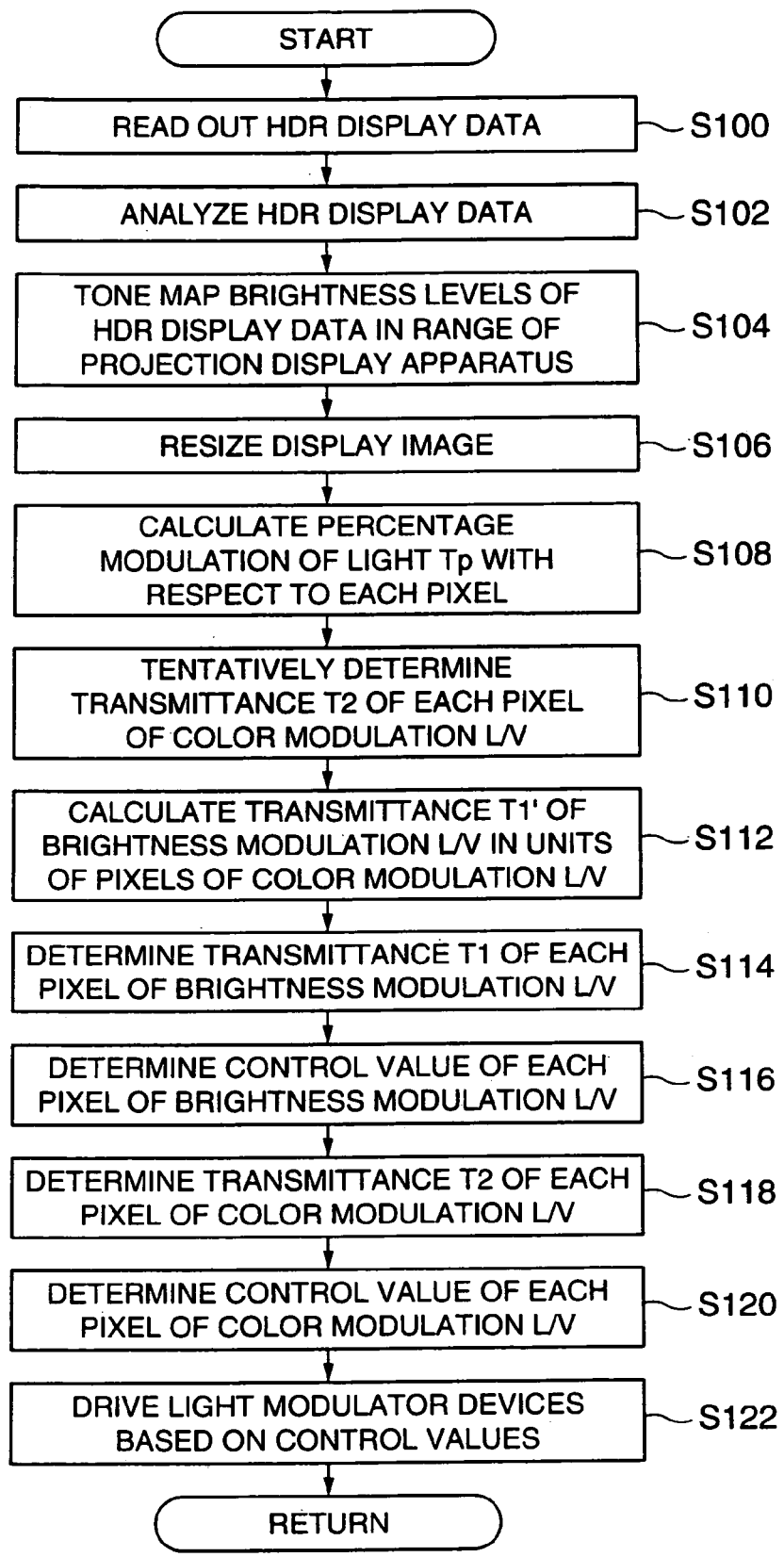
FIG. 10 is a flowchart showing an exemplary display control processing.

FIG. 10 is a flowchart showing the display control processing. The display control processing is processing of respectively determining the control values of the brightness modulation light valve and the color modulation light valves based on the HDR display data, and driving the brightness modulation light valve and the color modulation light valves based on the determined control values. When the processing is executed in the CPU 170, as shown in FIG. 10, first, the process moves to step S100.

At step S100, the HDR data is read out from the storage device 182.

Then, the process moves to step S102, and the read HDR display data is analyzed to calculate the histogram of pixel values and maximum value, minimum value, average value, etc. of the brightness levels. This analysis result is obtained to be used for automatic image correction of making a dark scene brighter, making a too bright scene darker, enhancing an intermediate part contrast, or the like, and using for tone mapping.

Then, the process moves to step S104, and the brightness levels of the HDR display data is tone mapped in the brightness dynamic range of the projector PJ1 based on the analysis result at step S102.

Figure 11:
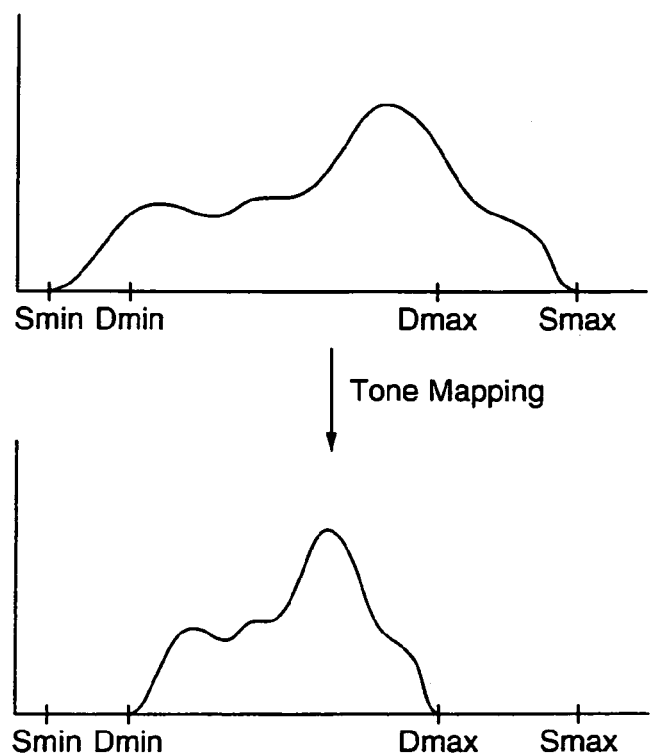
FIG. 11 is an exemplary diagram for explanation of tone mapping processing.

FIG. 11 is a diagram for explanation of the tone mapping processing. As a result of the HDR display data analysis, the minimum value of the brightness level included in the HDR display data is Smin, and the maximum value is Smax. Further, the minimum value of the brightness dynamic range of the projector PJ1 is Dmin, and the maximum value is Dmax. In the example in FIG. 11, because Smin is smaller than Dmin and Smax is larger than Dmax, the HDR display data can not be displayed appropriately using the values without change. Accordingly, the histogram of Smin to Smax is normalized so that it may fall within the range of Dmin to Dmax.

Details about tone mapping are disclosed, for example, in F. Drago, K. Myszkowski, T. Annen, and N. Chiba, "Adaptive Logarithmic Mapping For Displaying High Contrast Scenes", Eurographics 2003 (2003), which is incorporated herein by reference in its entirety.

Then, the process moves to step S106, and the HDR image is resized (enlarged or reduced) according to the resolution of the color modulation light valve. At this time, the HDR image is resized while holding the aspect ratio of the HDR image. As a resizing method, for example, the average value method, intermediate value method, and nearest neighbor method can be cited.

Then, the process moves to step S108, and the percentage modulation of light Tp is calculated with respect to each pixel of the resized image by the above equation (1) based on the brightness level Rp of a pixel of the resized image and brightness Rs of the light source 10.

Then, the process moves to step S110, and, giving an initial value (e.g., 0.2) as the transmittance T2 of each pixel of the color modulation light valve, the transmittance T2 of each pixel of the color modulation light valve is tentatively determined.

Then, the process moves to step S112, and the transmittance T1' of the brightness modulation light valve is calculated by the equation (2) in units of pixels of the color modulation light valve based on the calculated percentage modulation of light Tp, tentatively determined transmittance T2, and gain G. Here, since the color modulation light valve is formed by three liquid crystal light valves 60B, 60G, and 60R, transmittance T1' is calculated with respect to each of RGB three primary colors for the same pixel. Contrary, since the brightness modulation light valve is formed by one liquid crystal light valve 100, the average value thereof or the like is calculated as T1' of the pixel.

Then, the process moves to step S114, and, with respect to each pixel of the brightness modulation light valve, the weighing average value of the transmittance T1' calculated with respect to a pixel of the color modulation light valve overlapping with the pixel of interest in the light path is calculated as the transmittance T1 of the pixel of interest. The weighting is performed by the area ratio of overlapping pixels.

Then, the process moves to step S116, and, with respect to each pixel of the brightness modulation light valve, the control value corresponding to the transmittance T1 calculated with respect to the pixel is read out from the control value registration table 400 and the read control value is determined as the control value of the pixel. In the reading of the control value, the transmittance as the best approximation of the calculated transmittance T1 is retrieved from the control value registration table 400, and the control value corresponding to the retrieved transmittance by the search is read out. This search is realized as a high-speed search by performing it using the binary search method, for example.

Then, the process moves to step S118, and, with respect to each pixel of the color modulation light valve, the weighing average value of the transmittance T1 determined with respect to a pixel of the brightness modulation light valve overlapping with the pixel of interest in the light path is calculated, the transmittance T2 of the pixel of interest is calculated by the above equation (2) based on the calculated average value, the percentage modulation of light Tp and gain G calculated at step S108. The weighting is performed by the area ratio of overlapping pixels.

Then, the process moves to step S120, and, with respect to each pixel of the color modulation light valve, the control value corresponding to the transmittance T2 calculated with respect to the pixel is read out from the control value registration table and the read control value is determined as the control value of the pixel. In the reading of the control value, the transmittance as the best approximation of the calculated transmittance T2 is retrieved from the control value registration table, and the control value corresponding to the retrieved transmittance by the search is read out. This search is realized as a high-speed search by performing it using the binary search method, for example.

Then, the process moves to step S122, and the control values determined at steps S116 and S120 are output to the light valve driving device 180 and the color modulation light valves and brightness modulation light valve are respectively driven to project display images, and the series of processing are ended and the process is returned to the original processing.

Next, the generation process of image data to be written in the color modulation light valves (liquid crystal light valves 60B, 60G, and 60R) and the brightness modulation light valve (liquid crystal light valve 100) will be described according to FIGS. 12 to 15.

As below, the case where all of the color modulation light valves (liquid crystal light valves 60B, 60G, and 60R) have the resolution of horizontal 18-pixel×vertical 12-pixel and the number of gradations of 4 bits, and the brightness modulation light valve (liquid crystal light valve 100) has the resolution of horizontal 15-pixel×vertical 10-pixel and the number of gradations of 4 bits will be described as an example. Further, both views of the color modulation light valve and the brightness modulation light valve are seen from the light source 10 side.

In the display control device 200, through the steps S100 to S104, the HDR display data is read out and the read HDR display data is analyzed, and the brightness levels of the HDR display data is tone mapped in the brightness dynamic range of the projector PJ1 based on the analysis result. Then, through step S106, the HDR image is resized according to the resolution of the color modulation light valve.

Then, through step S108, the percentage modulation of light Tp is calculated with respect to each pixel of the resized image. For example, the percentage modulation of light Tp of the pixel p in the resized image is, given that the brightness level Rp (R, G, B) of the pixel p is (1.2, 5.4, 2.3) and the brightness Rs (R, G, B) of the light source 10 is (10000, 10000, 10000), (1.2, 5.4, 2.3)/(10000, 10000, 10000)=(0.00012, 0.00054, 0.00023).

Figure 12:
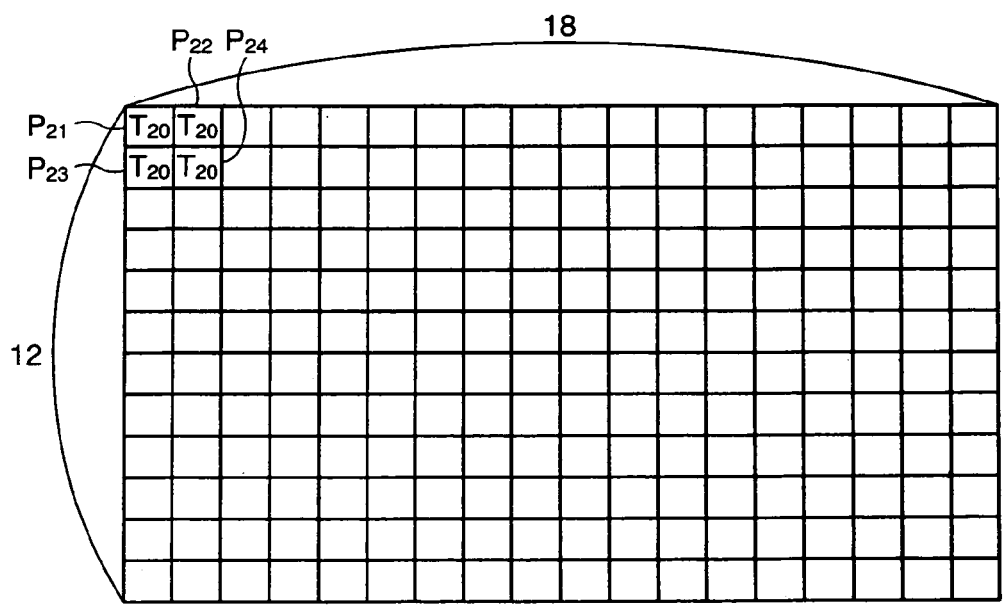
FIG. 12 shows the case where the transmittance of the color modulation light valve is tentatively determined.

FIG. 12 shows the case where the transmittance T2 of the color modulation light valve is tentatively determined. Then, through step S110, transmittance T2 of each pixel of the color modulation light valve is tentatively determined. Assuming that the pixels of upper left four partitions of the color modulation light valve are p21 (upper left), p22 (upper right), p23 (lower left), and p24 (lower right), initial values T20 are given to the transmittances T2 of the pixels p21 to p24 as shown in FIG. 12.

Figure 13:
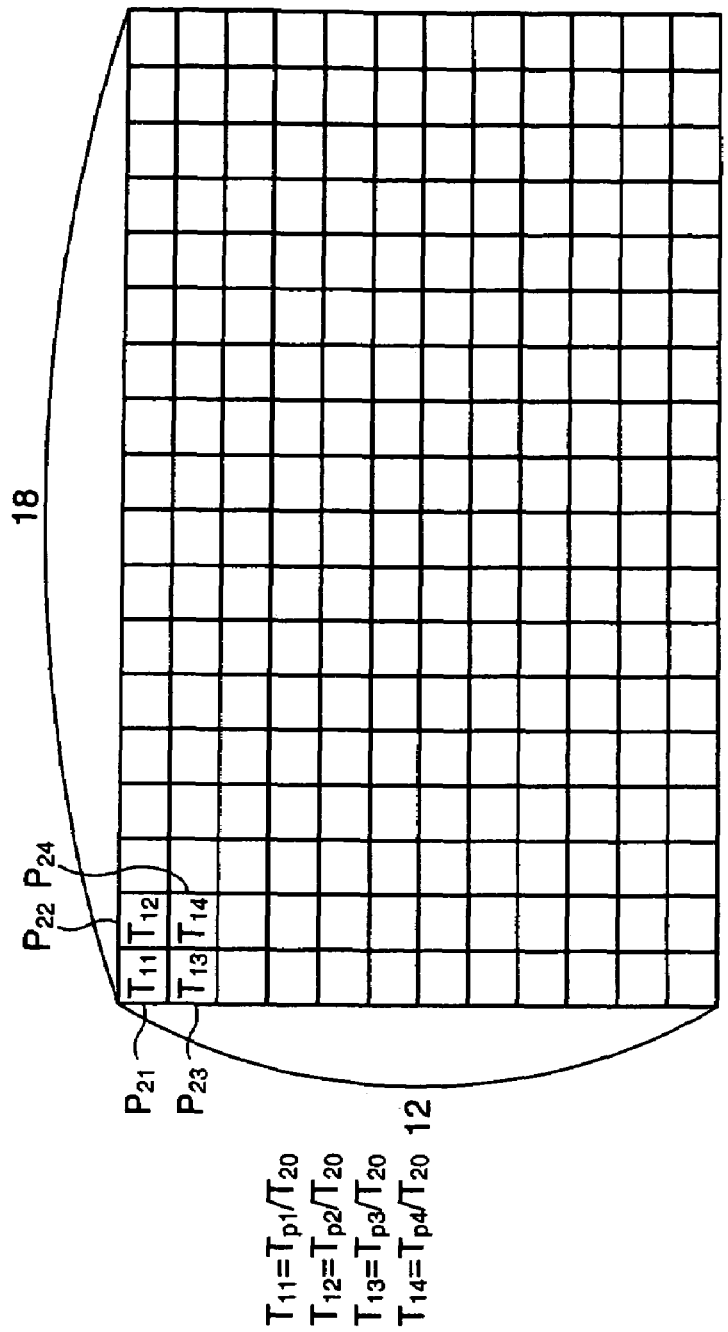
FIG. 13 shows the case where the transmittance of the brightness modulation light valve is calculated in units of pixels of the color modulation light valve.

FIG. 13 shows the case where the transmittance T1' of the brightness modulation light valve is calculated in units of pixels of the color modulation light valve.

Then, through step S112, the transmittance T1' of the brightness modulation light valve is calculated in units of pixels of the color modulation light valve. When attention is focused on the pixels p21 to p24, corresponding transmittances T11 to T14 of the brightness modulation light valve can be calculated by the following equations (3) to (6) given that the percentage modulations of light of the pixels p21 to p24 are Tp1 to Tp4 and gain G is "1" as shown in FIG. 13.

The calculation is actually performed using numeric values. When Tp1=0.00012, Tp2=0.05, Tp3=0.02, Tp4=0.01, and T20=0.1, by the following equations (3) to (6), T11=0.0012, T12=0.5, T13=0.2, and T14=0.1.

$$T11 = Tp1/T20 \qquad (3)$$

$$T12 = Tp2/T20 \qquad (4)$$

$$T13 = Tp3/T20 \qquad (5)$$

$$T14 = Tp4/T20 \qquad (6)$$

FIG. 14 shows the case where the transmittance T1 of each pixel of the brightness modulation light valve is determined.

Figure 14A:
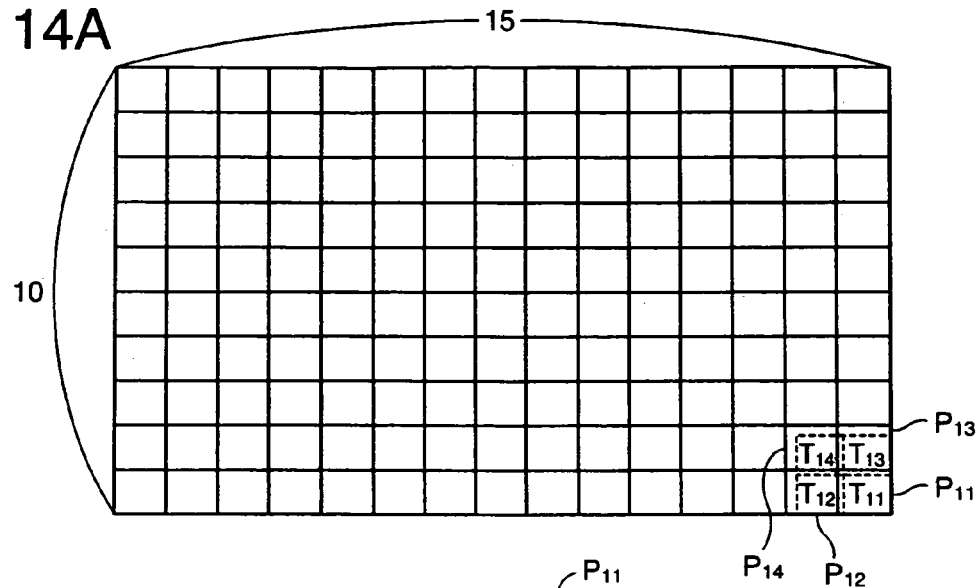
FIG. 14 shows the case where the transmittance of each pixel of the brightness modulation light valve is determined.
Figure 14B:
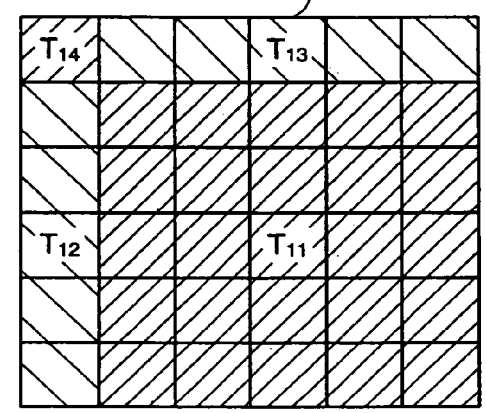
Figure 14C:
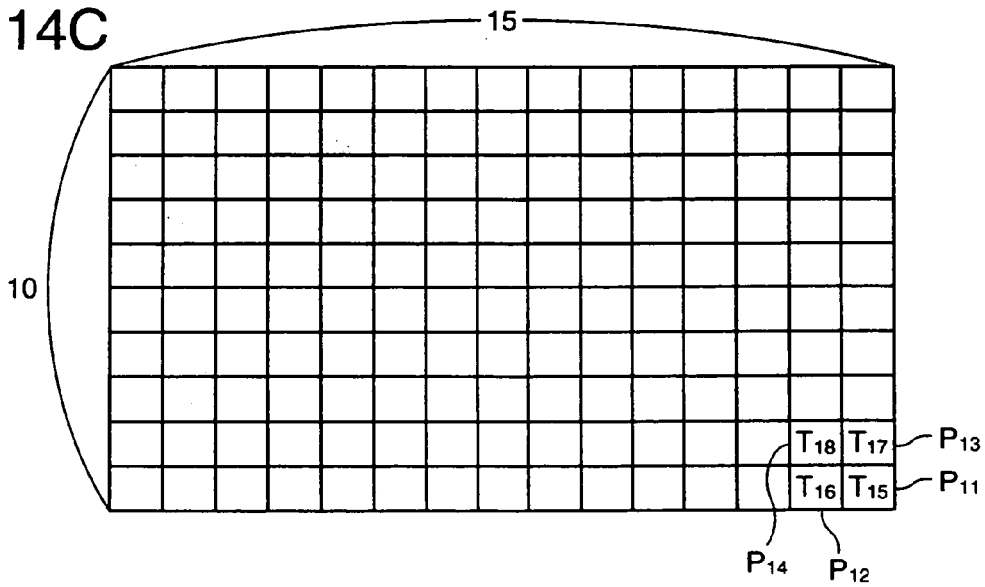

Then, through step S14, the transmittance T1 of each pixel of the brightness modulation light valve is determined. Since the brightness modulation light valve and the color modulation panel are in a relationship of inverted imaging with each other by the relay lens 90, the image of the pixels of the upper left four partitions of the color modulation light valve are formed at the lower right part of the brightness modulation light valve. Assuming that the pixels of the lower right partitions of the brightness modulation light valve are p11 (lower right), p12 (lower left), p13 (upper right) and p14 (upper left), the pixel p11 overlaps with the pixels p21 to p24 in the light path because the resolutions of the brightness modulation light valve and the color modulation light valve are different as shown in FIG. 14A. Since the resolution of the color modulation light valve is 18×12 and the resolution of the brightness modulation light valve is 15×10, the pixel p11 can be partitioned in the rectangular area of 6×6 based on the least common multiple of the number of pixels of the color modulation light valve. Further, the area ratio at which the pixel p11 overlaps with the pixels p21 to p24 is 25:5:5:1 as shown in FIG. 14B. Therefore, the transmittance T15 of the pixel p11 can be calculated by the following equation (7) as shown in FIG. 14C.

The calculation is actually performed using numeric values. In the case where T11=0.0012, T12=0.5, T13=0.2, and T14=0.002, by the following equation (7), T15=0.1008.

$$T15=(T11\times25+T12\times5+T13\times5+T14\times1)/36 \qquad (7)$$

The transmittances T16 to T18 of the pixels p12 to p14 can be obtained by calculating weighting average values by the area ratios similarly to that of the pixel p11.

Then, through step S116, with respect to each pixel of the brightness modulation light valve, the control value corresponding to the transmittance T1 calculated with respect to the pixel is read out from the control value registration table 400 and the read control value is determined as the control value of the pixel. For example, since T15=0.1008, referring to the control value registration table 400, as shown in FIG. 8, 0.09 is the most approximated value. Therefore, "8" is read out as the control value of the pixel p11 from the control value registration table 400.

FIG. 15 shows the case where the transmittance T2 of each pixel of the color modulation light valve is determined.

Figure 15A:
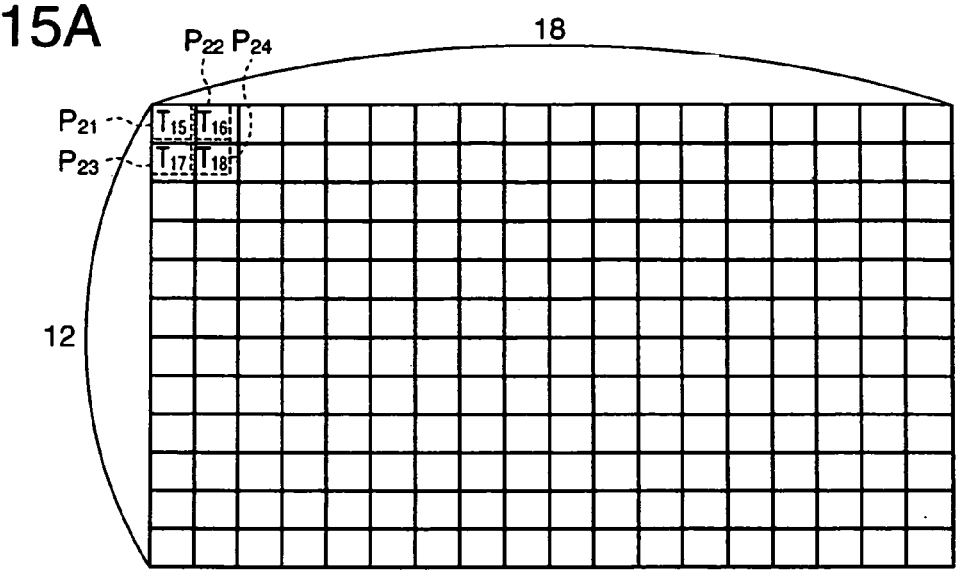
FIG. 15 shows the case where the transmittance of each pixel of the color modulation light valve is determined.
Figure 15B:
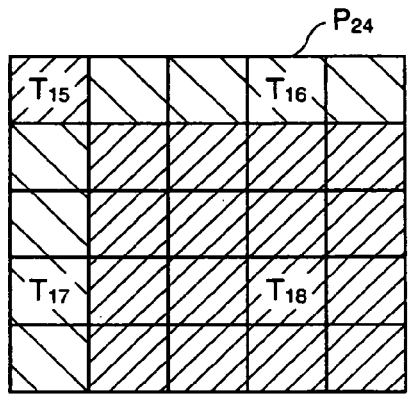
Figure 15C:
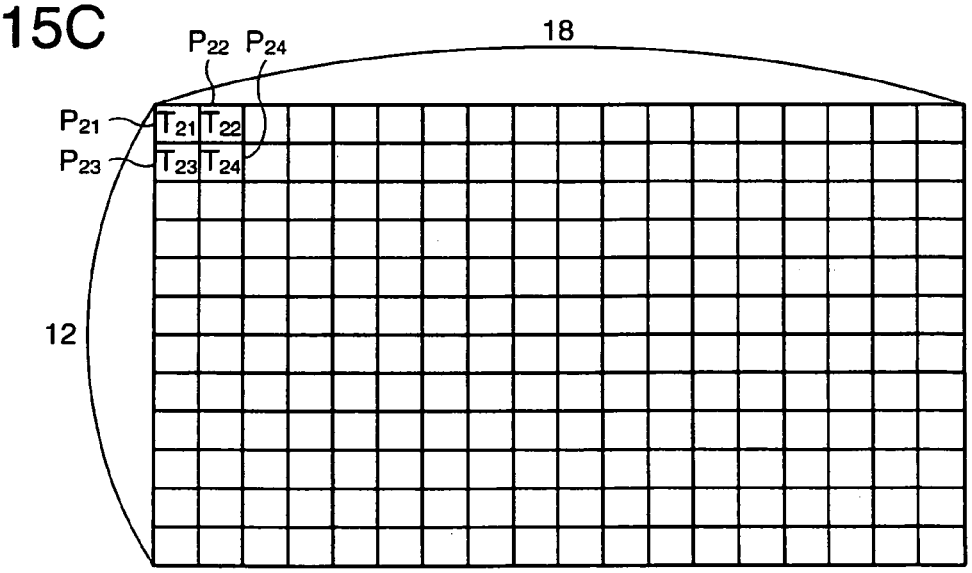

Then, through step S118, the transmittance T2 of each pixel of the color modulation light valve is determined. The pixel p24 overlaps with the pixels p11 to p14 in the light path because the resolutions of the brightness modulation light valve and the color modulation light valve are different as shown in FIG. 15A. Since the resolution of the color modulation light valve is 18×12 and the resolution of the brightness modulation light valve is 15×10, the pixel p24 can be partitioned in the rectangular area of 5×5 based on the least common multiple of the number of pixels of the brightness modulation light valve. Further, the area ratio at which the pixel p24 overlaps with the pixels p11 to p14 is 1:4:4:16 as shown in FIG. 15B. Therefore, when attention is focused on the pixel p24, the corresponding transmittance T19 of the brightness modulation light valve can be calculated by the following equation (8). Further, assuming that the gain G is "1", the transmittance T24 of the pixel p24 can be calculated by the following equation (9) as shown in FIG. 15C.

The calculation is actually performed using numeric values. In the case where T15=0.09, T16=0.33, T17=0.15, T18=0.06, and Tp4=0.01, by the following equations (8) and (9), T19=0.1188 and T24=0.0842.

$$T19=(T15\times1+T16\times4+T17\times4+T18\times16)/25 \qquad (8)$$

$$T24=Tp4/T19 \qquad (9)$$

The transmittances T21 to T23 of the pixels p21 to p23 can be obtained by calculating weighting average values by the area ratios similarly to that of the pixel p24.

Then, through step S120, with respect to each pixel of the color modulation light valve, the control value corresponding to the transmittance T2 calculated with respect to the pixel is read out from the control value registration table and the read control value is determined as the control value of the pixel. For example, when T24=0.0842 for the pixel p24 of the liquid crystal light valve 60R, referring to the control value registration table 420R, as shown in FIG. 9, 0.07 is the most approximated value. Therefore, "7" is read out as the control value of the pixel p24 from the control value registration table 420R.

Then, through step S122, the determined control values are output to the light valve driving device 180. Thereby, the brightness modulation light valve (liquid crystal light valve 100) and color modulation light valves (liquid crystal light valves 60B, 60G, and 60R) are respectively driven to project display images on the screen.

By the above described modulation control of the liquid crystal light valves, the expansion of brightness dynamic range and increase in number of gradations can be realized in two stages of the image forming process.

In the above first exemplary embodiment, the case where the resolutions of the liquid crystal light valves 60B, 60G, and 60R (color modulation light valves) as the first light modulator device are higher than that of the liquid crystal light valve 100 (brightness modulation light valve) has been described as an example, however, the resolutions of the two light modulator devices (color modulation light valves and brightness modulation light valve) may be the same or different. Note that, in the case where resolutions of both are different, as described in the first exemplary embodiment, the resolution of the display image data is required to be converted.

For example, when the brightness modulation light valve has higher display resolution than the display resolution of the color modulation light valve, because there is no need to set MTF (Modulation Transfer Function) high in the light transfer from the color modulation light valve to the brightness modulation light valve, the transmission performance of the intervening relay system is not required to be made so much higher, and the relay system can be formed relatively at a low price.

On the other hand, when the color modulation light valve has higher display resolution than the display resolution of the brightness modulation light valve, because the display image data is normally prepared according to the display resolution of the color modulation light valve, the conversion processing of resolution is required to be performed only once according to the display resolution of the brightness modulation light valve, and thereby, conversion processing of the display image data becomes easier.

The invention can be applied to a so-called direct-view type liquid crystal display apparatus (image display apparatus) by which the final optical image (display image) formed on the second light modulator device is directly viewed without enlarging it. As below, an example in which the invention is applied to a direct-view type liquid crystal display apparatus will be described.

Figure 16:
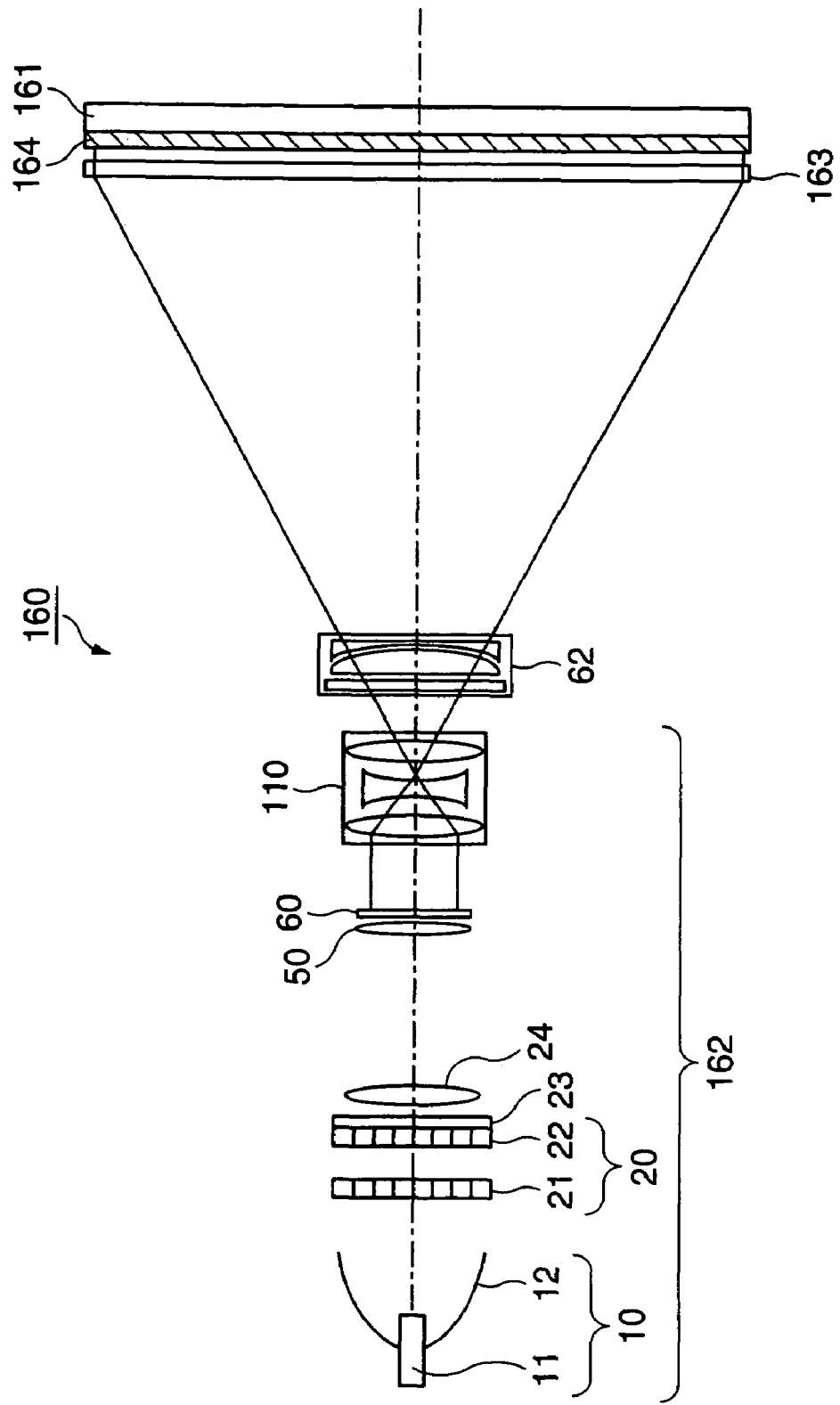
FIG. 16 shows a principal optical configuration of an image display apparatus (liquid crystal display apparatus) according to the invention.

FIG. 16 shows a principal optical configuration of an exemplary liquid crystal display apparatus 160 as a direct-view type liquid crystal display apparatus. The same signs are assigned to the component elements having the same functions in the projector PJ1 shown in FIG. 1 and the description thereof will be omitted or simplified.

As shown in FIG. 16, the direct-view type liquid crystal display apparatus 160 includes a transmissive liquid crystal display panel 161 as the second light modulator device, an illumination system 162 that illuminates the panel, and optical elements such as a Fresnel lens 163 and a light diffusion layer 164.

The illumination system 162 can include a light source 10, a uniform illumination system 20, a liquid crystal light valve 60 as the first light modulator device, and a projection lens 110.

The luminous flux exiting from the light source 10 enters the uniform illumination system 20 in which two lens arrays 21 and 22, a polarization conversion element 23, and a condenser lens 24 are sequentially provided, and the light intensity distribution at the luminous flux section is uniformized. The polarization conversion element 23 is formed by a PBS array and a half-wave plate, for example, and converts randomly polarized light output from the light source 10 into polarized light having vibrating directions are aligned in one direction, which can be utilized in the optical system in the subsequent stage.

The luminous flux exiting from the uniform illumination system 20 enters the liquid crystal light valve 60 as a first light modulator device and is subjected to the first modulation. The luminous flux modulated by the liquid crystal light valve 60 is enlarged and projected on the light incident surface of the liquid crystal display panel 161 by the projection lens 110 for illuminating the liquid crystal display panel 161. The exiting luminous flux from the illumination system 162 is polarized luminous flux, and the polarized wave plane thereof matches with the transmission axis of the light-incident side polarizer of the liquid crystal display panel 161.

The Fresnel lens 163 disposed in front of the liquid crystal display panel 161 substantially parallelizes the exiting luminous flux from the illumination system 162 and guides it to the liquid crystal display panel 161 for reduction of brightness variations in display images. Further, the light diffusion layer 164 is disposed on the light-incident surface of the liquid crystal display panel 161. The light diffusion layer 164 diffuses the exiting luminous flux from the illumination system 162 to broaden the light distribution, and thereby, expands the viewing angle of the display images.

In the liquid crystal display apparatus 160 having the above configuration, the modulated light that has formed the optical image (image) by the liquid crystal light valve 60 as the first light modulator device is used for illuminating the liquid crystal display panel 161 as the second light modulator device, and the final display image is formed by the liquid crystal display panel 161. That is, the light from the light source 10 is modulated in two stages of the image forming process via the serially arranged two light modulator devices (liquid crystal light valve 60, liquid crystal display panel 161). As a result, in the liquid crystal display apparatus 160, similarly to the above embodiment, the expansion of brightness dynamic range and increase in number of gradations can be realized.

Further, a rectifier 92 as a polarization compensation system for compensation of polarization changes is disposed between the projection lane 110 and the Fresnel lens 163. By the rectifier 92, in the optical path from the light source 10 to the liquid crystal display panel 161, an originally desired polarization state is maintained. As a result, in the liquid crystal display apparatus 160, display images with low brightness reduction and brightness variations and high dynamic range and advantageous gradation characteristics can be obtained.

Note that, in such a configuration, in the liquid crystal display apparatus 160, because the color modulation light valve (liquid crystal display panel 161) is used as the image display screen, the dimension thereof is preferably made larger than that of the brightness modulation light valve (liquid crystal light valve 60) and also the resolution is made higher.

The liquid crystal display apparatus 160 in FIG. 16 is an example in which one liquid crystal light valve 60 is provided in the illumination system 162, however, it should be understood that, as well as the projector PJ1 in FIG. 1, a 3-LCD illumination system having liquid crystal light valves with respect to each different color light of R (red), G (green), and B (blue) may be used. In this case, a color separation system as a light separating unit formed by a dichroic mirror etc. is disposed between the uniform illumination system and the liquid crystal light valves to separate light paths with respect to different each color light of R (red), G (green), and B (blue), and the respective color luminous fluxes modulated by the liquid crystal light valves with respect to each color light are combined by a color combining system of a cross dichroic prism etc. disposed between the liquid crystal light valves and the projection lens, and thereby, a luminous flux representing a color image is formed.

In the above described respective embodiments, the brightness of light is modulated in the two stages using the brightness modulation light valve and the color modulation light valve, however, it should be understood that, the invention is not limited to that, the brightness of light may be modulated in two stages using two brightness modulation light valves.

Further, in the above described exemplary embodiments, active matrix liquid crystal display devices are used as the liquid crystal light valves 60B, 60G, 60R, and 100, however, it should be understood that the invention is not limited to that, passive matrix liquid crystal display devices or segment liquid crystal display devices may be used for forming the liquid crystal light valves 60B, 60G, 60R, and 100. The active matrix liquid crystal display device has an advantage that precise gradation display can be performed, and the passive matrix liquid crystal display device and segment liquid crystal display device have an advantage that they can be manufactured at a low cost.

Further, in the above described respective embodiments, the projector PJ1 and the liquid crystal display apparatus 160 are formed by providing transmissive light modulator devices, however, it should be understood that the invention is not limited to that, the brightness modulation light valve or color modulation light valve may be formed from a transmissive light modulator device such as a DMD (Digital Micromirror Device).

Further, as the polarization compensation system, it should be understood that the invention not limited to the configuration using the dielectric films and rectifier having polarization compensation functions. Japanese Patent Application Publication No. Hei-11-72710 discloses a technology relating to an optical system for canceling polarization changes occurring in a polarization compensation microscope, etc. Further, in Japanese Patent Application Publication No. 2002-324342 discloses a technology of forming a multilayer film coating on a lens for compensating polarization rotation.

Further, in the above described respective exemplary embodiments, the case where the control programs that have been stored in the ROM 172 in advance are executed for executing the processing shown in the flowchart in FIG. 7 has been described, however, not limited to that, from a storage medium in which a program expressing these procedures has been stored, the program may be read into the RAM 174 and executed.

Here, the storage medium is a semiconductor storage medium such as a RAM and ROM, a magnetic storage medium such as an FD and HD, an optical reading storage medium such as a CD, CDV, LD, and DVD, and a magnetic storage/optical reading storage medium such as an MO, and includes any computer-readable storage medium regardless of reading methods such as electronic, magnetic, and optical reading methods.

Further, in the above described respective embodiments, a single light source that outputs white light is used as the light source 10 and the white light is spectroscopically separated into RGB three primary color lights, however, not limited to that, three light sources of a light source that outputs red light, a light source that outputs blue light, and a light source that outputs green light corresponding to RGB three primary colors, respectively, may be used and the unit for spectroscopically separating the white light may be removed.

As above, the preferred exemplary embodiments according to the invention have been described by referring to the accompanying drawings, however, needless to add, the invention is not limited to the examples. It should be clear that one skilled in the art can think of various altered examples or modified examples within the scope of technical ideas disclosed in the claims, and it would be naturally understood that those examples fall in the technical range of the invention.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An image display apparatus that displays an image by modulating light from a light source based on display image data, the apparatus comprising:
    a first light modulator device that modulates light from the light source, the first light modulator device including at least one light-exiting side polarizer;
    a second light modulator device that modulates the light from the first light modulator device; and
    a polarization compensation system disposed between the first light modulator device and the second light modulator device, the polarization compensation system changes a polarization state of light to return to nearly the same state as a polarization state of light after exiting the at least one-exiting side polarizer.

2. The image display apparatus according to claim 1, a relay lens being provided between the first light modulator device and the second light modulator device.

3. The image display apparatus according to claim 1, further comprising:
    a light separating unit that separates the light from the light source into lights in plural specific different wavelength regions; and
    performance of the polarization compensation system being designed in response to respective visibility of the lights in plural specific wavelength regions.

4. The image display apparatus according to claim 3, the polarization compensation system being designed so as to express a highest compensation performance to the light with a highest visibility of the lights in plural specific wavelength regions.

5. The image display apparatus according to claim 4,
    the lights in plural specific wavelength regions being three lights corresponding to respective colors of red, green, and blue; and
    the polarization compensation system being designed so as to express a highest compensation performance to the green light of the three lights.

6. The image display apparatus according to claim 1, the polarization compensation system including a dielectric film having a polarization compensation function.

7. The image display apparatus according to claim 1, the polarization compensation system including a rectifier, and the rectifier further including a half-wave plate and a lens with no refractive power.

8. The image display apparatus according to claim 7, one polarizer of a first polarizer disposed on a light-exiting surface side of the first light modulator device and a second polarizer disposed on a light-incident surface side of the second light modulator device being omitted.

9. A projector, comprising:
    the image display apparatus according to claim 1; and
    a projecting unit.

10. A polarization compensation system being an optical system changes a polarization state of light to return to nearly the same state as a polarization state of that after exiting at least one light-exiting side polarizer and that is disposed between two light modulator devices optically and serially arranged.

11. The polarization compensation system according to claim 10, further comprising:
    at least one of a dielectric film having a polarization compensation function and a rectifier.

* * * * *